United States Patent
Syed et al.

(10) Patent No.: US 10,626,545 B2
(45) Date of Patent: Apr. 21, 2020

(54) EMBEDDING NANOPARTICLES IN THERMOPLASTIC POLYMERS

(75) Inventors: Tofail Syed, Limerick (IE); Jacek Zeglinski, Limerick (IE); Patrick Cronin, Limerick (IE); Halina Podbielska, Wroclaw (PL); Ewa Dworniczek, Wroclaw (PL); Peter Tiernan, Limerick (IE); Roman Franiczek, Wroclaw (PL); Igor Buzalewicz, Wroclaw (PL); Magdalena Wawrzynska, Wroclaw (PL)

(73) Assignees: University of Limerick, Limerick (IE); Wroclaw Medical University, Wroclaw (PL); Wroclaw University of Technology, Wroclaw (PL)

(*) Notice: Subject to any disclaimer, the term of this patent is extended or adjusted under 35 U.S.C. 154(b) by 0 days.

(21) Appl. No.: 14/005,739

(22) PCT Filed: Mar. 16, 2012

(86) PCT No.: PCT/IB2012/000788
§ 371 (c)(1),
(2), (4) Date: Apr. 10, 2014

(87) PCT Pub. No.: WO2012/127326
PCT Pub. Date: Sep. 27, 2012

(65) Prior Publication Data
US 2014/0220091 A1 Aug. 7, 2014

Related U.S. Application Data

(60) Provisional application No. 61/454,252, filed on Mar. 18, 2011.

(51) Int. Cl.
D06M 11/46 (2006.01)
D06M 11/42 (2006.01)
(Continued)

(52) U.S. Cl.
CPC .......... D06M 11/46 (2013.01); B22F 1/0018 (2013.01); B22F 7/04 (2013.01); B82Y 30/00 (2013.01);
(Continued)

(58) Field of Classification Search
CPC .............................. D06M 11/46; D06M 11/42
See application file for complete search history.

(56) References Cited

U.S. PATENT DOCUMENTS

2006/0141223 A1* 6/2006 Oles ................... D06M 13/517
428/172
2008/0038830 A1* 2/2008 Ure ....................... B01J 19/0046
436/73
(Continued)

FOREIGN PATENT DOCUMENTS

WO WO/2011/106730 * 2/2011

Primary Examiner — Adam C Milligan
Assistant Examiner — Sarah Alawadi
(74) Attorney, Agent, or Firm — Brown Rudnick LLP; Thomas C. Meyers

(57) ABSTRACT

The present invention relates to a polymeric material having one or more nanoparticles embedded within the surface layer of a single side of the material. In some embodiments, the nanoparticles are microbiocidal nanoparticles which impart antimicrobial characteristics to the polymeric material within which they sprayed and pushed by are embedded.

8 Claims, 27 Drawing Sheets

(51) Int. Cl.
  *D06M 11/44*   (2006.01)
  *D06M 11/49*   (2006.01)
  *B22F 7/04*    (2006.01)
  *B82Y 30/00*   (2011.01)
  *D06M 11/79*   (2006.01)
  *D06M 16/00*   (2006.01)
  *B22F 1/00*    (2006.01)
  *C22C 5/06*    (2006.01)
  *C22C 5/02*    (2006.01)
  *D06M 23/08*   (2006.01)

(52) U.S. Cl.
  CPC .................. *C22C 5/02* (2013.01); *C22C 5/06* (2013.01); *D06M 11/42* (2013.01); *D06M 11/44* (2013.01); *D06M 11/49* (2013.01); *D06M 11/79* (2013.01); *D06M 16/00* (2013.01); *D06M 23/08* (2013.01)

(56) References Cited

U.S. PATENT DOCUMENTS

| | | | | |
|---|---|---|---|---|
| 2008/0291442 A1* | 11/2008 | Lawandy | ....................... | 356/301 |
| 2010/0144228 A1* | 6/2010 | Branham et al. | ............. | 442/401 |
| 2010/0178512 A1* | 7/2010 | Giesenberg | ............. | B29C 70/64 |
| | | | | 428/405 |
| 2012/0003449 A1* | 1/2012 | Yializis et al. | ................ | 428/213 |
| 2012/0308623 A1* | 12/2012 | Taxt-Lamolle | .......... | A61K 9/14 |
| | | | | 424/401 |

\* cited by examiner

FIGURE 15

| Material | Textile | Textile | Textile | Textile |
|---|---|---|---|---|
| Polymer | PET | PET | Acrylic | Cellulose Acetate |
| Nanoparticle | TiO$_2$ | Ag/Ti | TiO$_2$ | TiO$_2$ |
| Concentration (wt.%) | 0.25 | 0.25 | 0.25 | 0.25 |
| Cleaning blower (bar) | 1 | 1 | 1 | 1 |
| Material Velocity (cm/sec) | 3 | 3 | 3 | 3 |
| Pre-Heater (°C) | 30 | 30 | 30 | 30 |
| Spray-Nozzle Flow rate (l/min) | 0.05 | 0.05 | 0.05 | 0.05 |
| Nozzle Pressure (bar) | 1.5 | 1.5 | 1.5 | 1.5 |
| Spring Stiffness (N/m) | 80 | 80 | 80 | 80 |
| Material Distance to Nozzle (cm) | 20 | 20 | 20 | 20 |
| Hot-Plate Temperature (°C) | 190 | 190 | 170 | 190 |

EMBEDDING NANOPARTICLES IN THERMOPLASTIC POLYMERS

RELATED APPLICATIONS

This application is a national-stage entry of International Patent Application No. PCT/IB2012/000788, filed 16 Mar. 2012, which claims priority to U.S. Ser. 61/454,252, filed Mar. 18, 2011, both of which are incorporated by reference herein in their entireties.

TECHNICAL FIELD

The present invention generally relates to nanoparticle embedded textiles. In particular, the invention relates to polymeric materials having microbiocidal nanoparticles embedded within a single surface layer thereof.

BACKGROUND OF THE INVENTION

Sterilization of textile materials is typically conducted by consumers and service providers (e.g., hospitals, nursing homes and hotels) using a conventional aqueous immersive laundry process or dry cleaning methods. Conventional laundering requires relatively large amounts of water, and the articles are subject to fading and deterioration after repeated washes. Dry cleaning processes rely on non-aqueous solutions for cleaning. However, the large amounts of solvents and the need for dedicated dry cleaning operations make this form of cleaning inconvenient and expensive. Additionally, while the conventional and dry cleaning processes may be effective to remove body soils, dirt and/or stains, they do not effectively sterilize the fabric articles or textiles, posing a public health problem in hotels, inns, and particularly in hospitals, clinics and nursing homes, where visitors and indwellers are less immune to infectious microbes.

Recent advances in textile technology have produced textiles having microbiocidal agents incorporated in or on the surface of the fabric article or textile. For example, metal based inorganic compounds such as silver (Ag), zinc oxide (ZnO) or titanium dioxide ($TiO_2$) can be utilized as microbiocidal agents and have been adapted for incorporation on or in a variety of different substrates and surfaces. Such inorganic compounds have been incorporated within melt spun synthetic fibers in order to provide fabric articles which antimicrobial characteristics. This method incorporates these antimicrobial compounds into the bulk of the melt-spun fibres. As microbial attack initiates and continues mostly on the surface and the subsurface region of textiles, bulk incorporation of antimicrobial compounds by using e.g. melt spinning is a inefficient method as it rarely keeps the antimicrobial agent at the surface.

A contact with solid surfaces provides microbes a favorable environment to grow and spread. A method that kills microbes on contact will make effective microbicidial surface. Attempts have been made to apply such metal-based microbiocidal agents on the surfaces of fabrics, with little success from a durability standpoint. For example, spray methods and dip-coating techniques have been utilized to apply inorganic compounds to fibers prior to or after weaving or knitting. However, such techniques are not wash-durable, resulting not only in a loss of antimicrobial properties after a few washes, but also an increase in environmental pollution due to the elution of loose microbiocidal agents into the effluent. Moreover, the poor adhesion characteristics of such metal-based compounds to fabric articles or other textiles can pose a serious health risk to individuals wearing or in direct contact with such articles.

The major difficulty in surface incorporation of microbiocidal agents into textiles lies in the adhesion and binding of these agents to the surface of the textiles. Textile fibres are made of either natural or synthetic polymers or a blend of these two.

It is known in the art that some of the natural and synthetic polymers used in textiles are thermoplastic in nature i.e. they deform when heated.

While techniques have been used to improve the adhesion of these inorganic compounds to the surface of textiles, e.g. by chemical functionalization of the textile surface with organic molecules, or by modification of a polymer surface by physical means (e.g., low temperature, high pressure plasma treatments) they still suffer from poor durability due to the problem associated with binding of inorganic microbiocidal agents to textile surfaces. Such techniques are therefore unsuitable in industrial textile applications due to the level of expense and environmental pollution.

A number of metal-based microbiocidal agents owes there anti-microbial actions due to surface interactions with microbes either directly through penetration or indirectly through the generation of antimicrobial species such as nascent oxygen, hydroxyl or peroxy ion produced as a result of photocatalytic activity.

In many cases, these metal based microbiocidal agents are nanoparticles i.e. at least one dimension of these nanoparticles (height, width or length) is smaller than 100 nm ($10^{-7}$ m).

It is known in the art that such a smaller dimension enormously increases the surface area in nanoparticles. Nanoparticles are also known to possess extraordinary and otherwise impossible crystal structures, morphology and physic-chemical properties such as photocatalytic properties, photoluminescence, high yield point, superior electronic conduction, superhydrophobicity etc. Nanoparticles, due to their enormous surface area, may also possess very high surface energy and activity, which often forces them to form clusters or aggregates. While the effective surface area reduces if nanoparticles aggregates or clusters, it can be still much higher than that available e.g. from their micro-size counterparts.

It is usually the frontal surface of a textile product exposed to the ambient environment that is more prone to the growth and spread of microbes. Paradoxically, this frontal surface is also exposed to photons from sunlight or any suitable artificial light source, which can more effectively cleanse the textile surface through photocatalytic actions, for example. The microbiocidal actions take place at the surfaces of these metal based microbiocidal agents, which means that a higher amount of surface area exposed to the ambient will result in a larger extent of surface reactions to kill microbes.

Currently, most techniques to produce inorganic compound-based antimicrobial finishes or surface coatings on textiles yield a relatively thick, often continuous, two-sided coating on the textile product. A continuous coating of microbiocidal agents on textiles is unnecessary due to the colloidal nature and finite size of microbes during their planktonic stage of growth during which the action of microbiocidal action is most effective. It also has the limitation of resulting in a weaker interface due to the inherent difficulty in achieving a strong bonding with the textile surface over a large area. A thick coating accentuates this problem by further weakening the interface due to the mismatch of elastic properties between harder metal-based microbiocidal agents and the soft and compliant textiles matrix. This increases the risk of dislodgement of microbiocides during use and cleaning operations. It also significantly reduces the surface area of the microbiocide that would have been otherwise available to kill bacteria.

Application of microbiocidal agents on both sides of a textile product is also less meaningful if the microbiocidal action takes place on the surface that is exposed to the stimulus (e.g. a photon from a light source) that is responsible for the microbiocidal action.

SUMMARY OF THE INVENTION

The present invention provides polymeric materials having microbiocidal nanoparticles embedded within a single surface layer of the polymeric material. The embedding process described herein provides superior adhesion and binding of nanoparticles to the polymer surface. The superior binding significantly reduces the risk of dislodgement of nanoparticles during use, washing or care thus minimizing the risk as an environmental or a health hazard. A strong bonding is achieved by utilizing the thermoplastic nature of the polymer in modifying its surface without adversely affecting the bulk properties such as compliance, appearance or durability. Additionally, the embedding process of the invention significantly reduces the amount of nanoparticles required for efficient killing of microbes by incorporating the nanoparticles only on a single surface of the polymeric material. The invention results in a one-sided, non-continuous distribution with separated nanoparticles, which do not form any thick film or coating on the surface and as such reduces the risk of flaking or delamination of coatings that can arise from a thicker coating. The invention thus provides a safe, durable, environmentally safe, inexpensive and industrially scalable technique for producing antimicrobial polymeric textiles using microbiocidal nanoparticles.

In one aspect, the invention provides a polymeric material having one or more nanoparticles embedded in a surface layer of a single surface of the material, the surface layer having a thickness less than or equal to the diameter of the nanoparticle.

The nanoparticle can be in a micellar, a colloidal or a sol-gel state that may or may not contain another microbiocidal agent. In one aspect e.g. the nanoparticle possesses microbiocidal property. In another aspect, the nanoparticle is or contains an inorganic compound, such as a metal or a metal-based formulation, which has microbiocidal properties. Examples of such inorganic compounds include, without limitation, gold, copper, zinc, iron, silver, titanium, a rare earth element, or a combination thereof, and their compounds with oxygen, sulfur, chlorine, fluorine, bromine, iodine, nitrogen and phosphorus. In a particular aspect, the microbiocidal agent is a photocatalytic agent that is activated by radiation with a wavelength or a distribution of wavelengths ($\lambda$) ranging from near infrared radiation (700 nm<$\lambda$<5000 nm) to ultraviolet (10<$\lambda$<400 nm) radiation, through visible radiation (400 nm<$\lambda$<700 nm). Preferably, the photocatalytic agent is a metal-based formulation, such as $TiO_2$, $Ag_2O$, Ag—$TiO_2$, ZnO, $Fe_2O_3$, $ZnFe_2O_4$, $CeO_2$, $La_2O_3$, $Eu_2O_3$, $Fe_2O_3$. $SiO_2$, $TiO_2$ or a combination thereof. Such photoctalysts can come in pristine form, as a mixture of different morphologies and structure (e.g. a 80:20 anatase $TiO_2$: rutile $TiO_2$, or $_a$ core-shell morphology), as heterostructures (e.g. $Fe_2O_3$.$TiO_2$), or as doped with metallic (e.g. V, Mn, Fe, Ag, Cr, Au) or nonmetallic (e.g. S, N, Cl, I, F) ions or defects (e.g. a vacancy).

The polymeric material preferably contains a thermoplastic polymer. Examples of thermoplastic polymers include, without limitation, cellulose rayon, cellulose acetate, polyester, polyamide, polyurethane, polyurea, acrylic, olefin, aramid, azlon, modacrylic, novoloid, nytril, aramid, spandex, vinyl polymer, vinal, vinyon, or a combination thereof. Alternatively, the polymeric material can be a blend of a thermoplastic polymer and a natural material such as wool, linen, cotton, silk, or a combination thereof.

The invention also provides a method of producing a nanoparticle embedded polymeric material having at least two surfaces (i.e., two sides), modifying the surface layer of only one of these surfaces at a depth sufficient to receive one or more nanoparticles in the surface layer, and depositing one or more nanoparticles onto the modified surface layer to embed the one or more nanoparticles in the modified surface layer.

The surface layer is altered at a depth less than or equal to the diameter of the nanoparticles, thereby ensuring that the nanoparticles are distributed within the surface layer, and not deeper.

In one aspect, the surface layer is modified by thermal, mechanical and/or chemical treatment of the surface layer. For example, the surface layer can be chemically modified by pre-treating the surface layer with a chemical, such as hydrogen peroxide, to facilitate surface incorporation of nanoparticles in subsequent thermo-mechanical treatment i.e. to heat the polymeric material above its softening temperature but below its melting temperature, to a depth less than or equal to the diameter of the nanoparticle(s) to be embedded within.

The one or more nanoparticles are deposited in a manner such that the nanoparticles are distributed as patches of individual nanoparticles, their clusters or agglomerates across the surface of a single side of the polymeric material and do not form a continuous layer or films or coatings.

Nanoparticle deposition can take place prior to or after the thermal, mechanical and/or chemical treatment of the surface. For example, the nanoparticles can be deposited by spraying the nanoparticles onto a thermally, mechanically, and/or chemically treated surface layers. The nanoparticles can be sprayed at a velocity sufficient to embed the nanoparticles into the modified surface layer. Alternatively, nanoparticles can be deposited by spraying the nanoparticles onto a surface layer (e.g., after hydrogen peroxide treatment). Sufficient amount of heat is then applied to the surface layer after nanoparticle deposition to soften the surface layer to a depth less than or equal to the diameter of the deposited nanoparticles. Pressure is then applied to the nanoparticle-deposited, modified surface (e.g., using rollers) to facilitate the embedding process. Heat is applied so that it modifies the surface of the polymer only and not the bulk. When the polymer cools, it recovers from its softened state and cringes which provides a stronger bonding due to mechanical interlocking of the embedded particles within the surface.

The nanoparticle can be a micellar, a colloidal or a sol-gel composition that contains a microbiocidal agent. For example, the microbiocidal agent can be a metal-based formulation that contains an inorganic compound having microbiocidal properties. Examples of such inorganic compounds include, without limitation, gold, copper, zinc, iron, silver, titanium, a rare earth element, or a combination thereof. In a particular aspect, the microbiocidal agent is a photocatalytic agent that is activated by radiation ranging from near infrared radiation to ultraviolet radiation, to visible radiation. Preferably, the photocatalytic agent is a metal-based formulation, such as $TiO_2$, $Ag_2O$, $Ag—TiO_2$, $ZnO$, $Fe_2O_3$, $ZnFe_2O_4$, $CeO_2$, $La_2O_3$, $Eu_2O_3$, or a combination thereof.

The polymeric material is preferably a thermoplastic polymer. Examples of thermoplastic polymers include, without limitation, cellulose rayon, cellulose acetate, polyester, polyamide, polyurethane, polyurea, acrylic, olefin, aramid, azlon, modacrylic, novoloid, nytril, aramid, spandex, vinyl polymer, vinal, vinyon, or a combination thereof. Alternatively, the polymeric material can be a blend of a thermoplastic polymer and a natural material such as wool, linen, cotton, silk, or a combination thereof.

Various aspects, features, objects, advantages, and details of the invention herein disclosed will become apparent through reference to the following description, the accompanying drawings, and the claims.

BRIEF DESCRIPTION OF THE DRAWINGS

In the drawings, like structures and items typically are referenced by the same or similar reference numbers throughout the various views. The illustrations in the drawings are not necessarily drawn to scale, the emphasis instead being placed generally on illustrating the principles of the invention and the disclosed embodiments.

FIG. 15. presents optimised process parameters using the automatic embedding rig for polymeric materials and nanoparticles.

DETAILED DESCRIPTION

Figure 1:
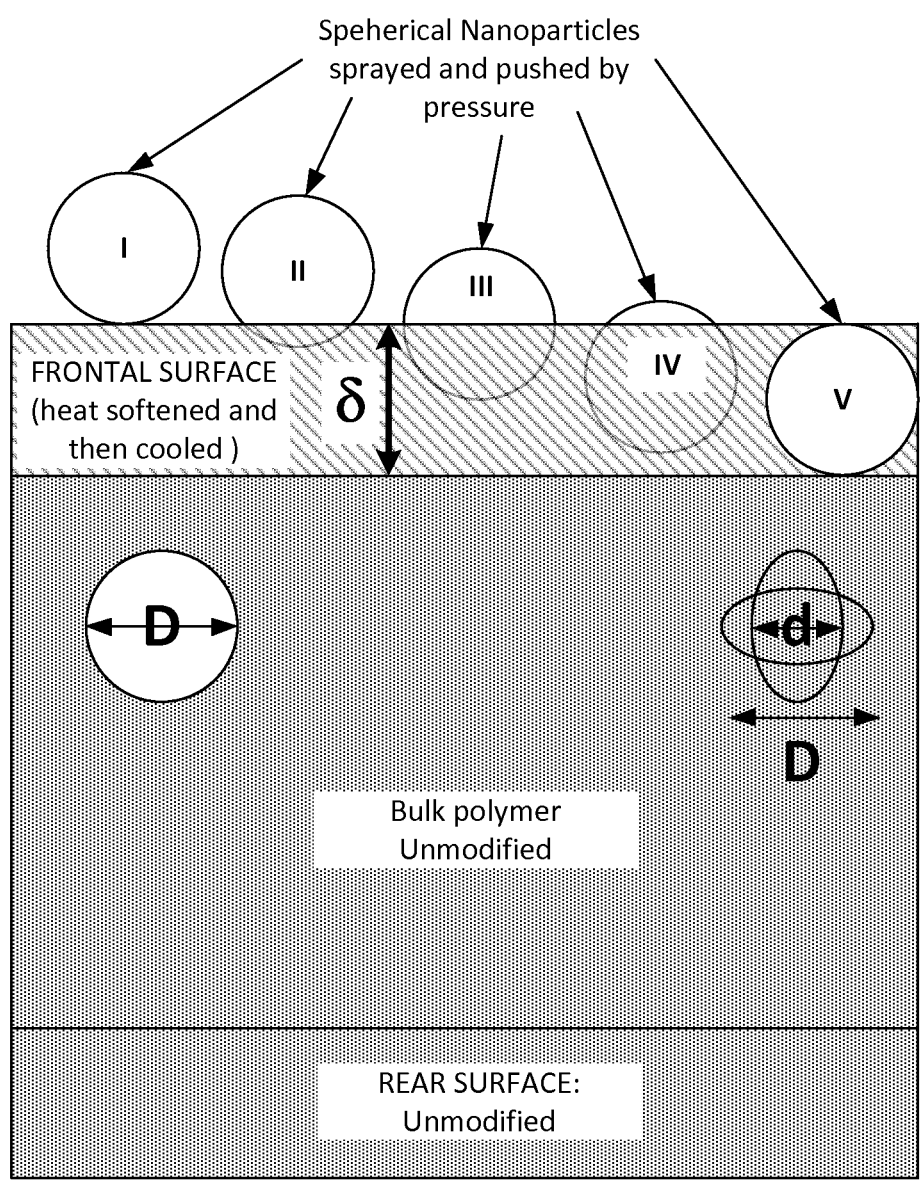
FIG. 1. is a schematic showing different extent of embedding of a spherical nanoparticle into a cooled polymeric surface previously softened by the application of heat:
 I. point contact adhesion with the weakest bonding with the polymer surface results in the maximum exposed surface area for microbiocidal action
 II. partial embedding with slightly stronger bonding with the polymer surface but also with a slightly reduced surface area for microbiocidal action than in I
 III. optimal embedding with optimally stronger bonding with the polymer surface along with smaller but still reasonable surface area for microbiocidal action
 IV. sub-optimal embedding with much stronger bonding with the polymer surface but with a significantly reduced surface area for microbiocidal action than in I-III and
 V. Sinking of nanoparticle having the strongest bonding with the polymer surface but there is no surface area exposed for microbiocidal action.
[For a spherical nanoparticle, the penetration depth $\lambda$ is defined by the diameter of the spherical nanoparticle, i.e $0 \leq D \leq \delta$. An optimal combination of maximum exposed surface area for bacteriocidal action and maximum penetration for stronger bonding occurs when $\delta$ approaches half the diameter of the nanoparticle (D/2). For nonspherical nanoparticles with a long dimension, D and short dimension d, the best combination of surface area and bonding is obtained when $\delta$ approaches half the shortest dimension (d/2).]
Figure 2:
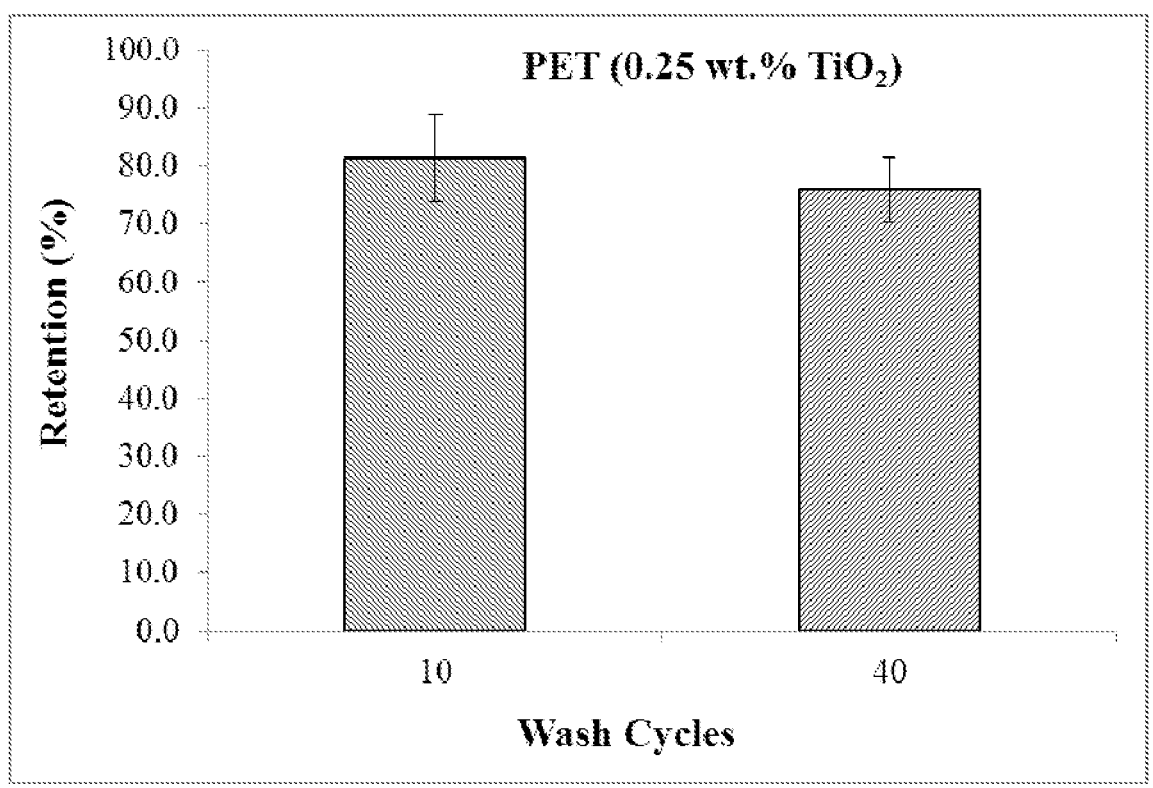
FIG. 2. shows nanoparticle retention to polymeric materials after 10 & 40 wash cycles (including 1 cycle of pre-wash).

The present invention provides a novel method of immobilizing/embedding nanoparticles containing a microbiocidal agent on or in a surface layer of a single side of a polymeric material (as used e.g. in a textile) by the combined action of heat and pressure.

In contrast to previous methods for coating or finishing fabrics or other textiles with a nanoparticle-based microbiocidal agent, the present invention does not require a binder reagent (typically organic reagents, solvents, or toxic chemicals) but still achieves superior adhesion and bonding by modifying the surface of the polymer by thermal and mechanical means which can be further facilitated by a chemical pre-treatment. The invention thus provides an inexpensive, environmentally safe, and industrially scalable technique.

In addition, the method of the invention does not require a continuous or thick layer or coating for microbiocidal actions and thus allows the use of a much smaller quantity of microbiocidal nanoparticles that are deposited on a single surface of a polymeric material. This is in stark contrast with the methods in the art that produce a continuous, thick, two-sided coating or finish by using significant amount of microbiocidal agents which are prone to dislodgements to a much higher extent and may become a health and environmental concern.

The smaller quantity of nanoparticles and the single surface layer immobilization ensures much stronger bonding, longer durability of the product, and a lower toxicological risk associated with the use of the nanoparticles. It is however important to reach a minimal inhibitory concentration (MIC) of nanoparticle at the polymer surface to obtain any effective microbiocidal effect at all. Below this limit, the polymeric material will lose its microbiocidal properties.

Preferably, the nanoparticle solution is deposited in a manner which distributes the nanoparticles across the surface layer with the aim of achieving a monolayer. While a uniform distribution with controlled placement of a monolayer of nanoparticles is ideal, in reality, distribution of nanoparticles, their clusters or agglomerates as thin patches (thickness=1-10 times the height of the nanoparticle, more preferably between 1-4 times the height of the nanoparticle) across the polymer surface is more pragmatic for large scale production and sufficient to achieve efficient microbiocidal performance.

The formation of thick patches must be avoided. The width of the patches can vary from the size of a single nanoparticle to a few tens of microns, but it will be preferable to have this width as small as possible, preferably between the size of a nanometer to 50 times the size of the said nanoparticle and more preferably between the size of a nanometer to 10 times the size of the said particles. The separation of these patches is also important. A too high separation between patches will leave a high amount surface area for microbial growth. On the other hand, a too small separation will reduce the surface area and the microbiocidal efficiency. A separation of 0.2-5 micron is preferable, and a separation of 0.5-2 micron is more preferable for the maximum microbiocidal efficiency.

The size and spacing of the distribution of these patches can be controlled by monitoring parameters such as the concentration of nanoparticles in the colloidal suspension deposited on the polymeric surface, the duration of spraying, the distance between the polymeric material and the spray-nozzle, the diameter and shape of the spray-nozzle, and/or the pressure applied to the spray-nozzlespray-nozzle.

The starting concentration of nanoparticles in the colloidal suspension has an important contribution to the final distribution of nanoparticles on the polymer surface. Also, if the nanoparticles have a tendency to agglomerate within the starting solution, the distribution on the polymer surface will be poorer. To eradicate this problem, the starting nanoparticle suspension must be de-agglomerated by methods known in the art such as ultrasonic or magnetic stirring, electro hydrodynamic forces or by chemical means such as adding a suitable surfactant. The final bonding of nanoparticles to the polymeric surface would also depend on the chemistry, morphology and surface hardness of the nanoparticles.

For $TiO_2$ and Ag—$TiO_2$, a starting concentration of nanoparticles should preferably range from between 2 and 0.005 wt. %, and more preferably from 0.5-0.1 wt. % and even more preferably from between 0.3 and 0.25 wt. %. This starting concentration will result in a surface concentration of the nanoparticles on the polymeric surface.

The spraying speed on to the polymer surface can range from 0.05-50 cm/sec and more preferably from 0.1-30 cm/sec and more closely from 0.1-0.8 cm/sec. The distance between the polymeric material and the spray nozzle, needs adjustment depending on the area to be covered and the starting spray-nozzle pressure. A distance of polymer surface to nozzle from 1-200 cm can be used but preferable range is between 1-50 cm, and more preferable from 4-20 cm. The diameter and shape of the spray nozzle can be such that the resulting spray patterns will be solid cone, hollow cone, semi-solid cone, narrow spray angle, flat fan, even-fan and any angle at the exit of the nozzle, therefore effecting the spray pattern. A nozzle exit angle from 30-180° and more closely from 70-120°. A fluid pressure delivered to the spray-nozzle can range from 0.1-100 bar, more preferably from 1-5 bar.

The preferable range of the resulting surface concentration for effective microbiocidal actions is 1-200 µg/cm², preferably, 1-100 µg/cm² and more preferably between 15-50 µg/cm² and even more preferably from 10-30 µg/cm².

A prewash cycle is necessary to ensure that any particles that are not bonded are dislodged during the production stage and be used again e.g. through a close loop cycle, which will increase efficiency of nanoparticle use and reduce cost and risks of further dislodgement of nanoparticles during use.

The preferable range of the resulting surface concentration of TiO2 or Ag:TiO2 (average size between 10 and 50 nm) for effective microbiocidal actions is 1-200 µg/cm$^2$, more preferably, 1-100 µg/cm$^2$, more preferably between 15-50 µg/cm$^2$ and even more preferably from 10-30 µg/cm$^2$. The surface MIC will of course vary with the density, size and chemistry of the nanoparticles.

Nanoparticle Embedded Polymeric Materials

Superior bonding of the nanoparticles to a polymer surface is achieved by the application of heat to the outermost layer of a single surface (i.e., single side) of the polymeric material (the heat softened layer in FIG. 1). The heat treatment must be conducted above the glass transition temperature ($T_g$), preferably above the softening temperature ($T_s$) but below the melting temperature ($T_m$) of the polymeric material. A temperature window of $T_m$-$T_g$ can be defined for a given polymeric material within which the application of heat will create a softened surface with a depth less than or equal to the diameter of the nanoparticle(s) to be embedded within the surface layer (FIG. 1). The depth of the softened surface of the polymer is critical to determine the embedded depth of nanoparticles, which in turn determines how much surface area is available for effective microbiocidal activity of the given nanoparticle, or its cluster or aggregates. Optionally, the polymer surface can be pre-treated with a chemical prior to heat treatment to increase the reactivity of the surface layer with the nanoparticles. For example, an environmentally friendly chemical such as hydrogen peroxide, which can be easily decomposed to oxygen and water, can be used to treat the polymer surface prior to heat treatment.

A suspension of microbiocidal nanoparticles (e.g., a colloidal water suspension of dispersed nanoparticles), is deposited onto the heat-softened surface layer, either before or after or during the thermal treatment of the polymer surface. In an embodiment where the polymer surface is heated prior to nanoparticle deposition, care must be taken to deposit the nanoparticles soon enough while the surface layer is still soft so as to achieve sufficient incorporation of the nanoparticles on or in, at least, a portion of the surface layer. For example, the nanoparticles can be deposited by spraying a nanoparticle suspension onto a heat-softened surface layer of a polymeric material (e.g., using a spray-nozzle or by a fully automatic spraying rig) at a velocity sufficient to bring the nanoparticles to the softened surface layer. Alternatively, the nanoparticle suspension is deposited onto a single surface (i.e., single side) of the polymeric material, then heat is applied to soften the surface and allow the deposited nanoparticles to become incorporated into the softened surface. After deposition and/or heat treatment, pressure is applied to the nanoparticle-deposited surface layer to ensure incorporation of the deposited nanoparticles into the softened surface layer of the polymeric material. The polymeric material is then allowed to cool below its softening temperature, at which point the nanoparticles become securely embedded within the surface layer of the polymeric substrate. The whole process can be integrated into one manual or automatic system that applies the above steps individually or in combination thereof in a sequence described above or in any combination of sequences that may or may not include a pre-wash cycle as described in the preceding section.

Softening of the polymer surface can be achieved in a variety of ways. For example, the polymeric material can be placed directly or indirectly on or under a hot plate, or in between two flat plates (e.g., ceramic or Teflon-coated) to heat a single-side of the polymeric material. Alternatively, the polymeric material can be heated using overhead heating elements such as radiation heaters or using lasers. Likewise, pressure treatment can be achieved in a variety of ways. For example, pressure can be applied using a block, a plate, or a roller. Alternatively, a calendaring process can be used to finish embedding of the nanoparticles within the softened surface layer of the polymeric substrate.

Figure 3:
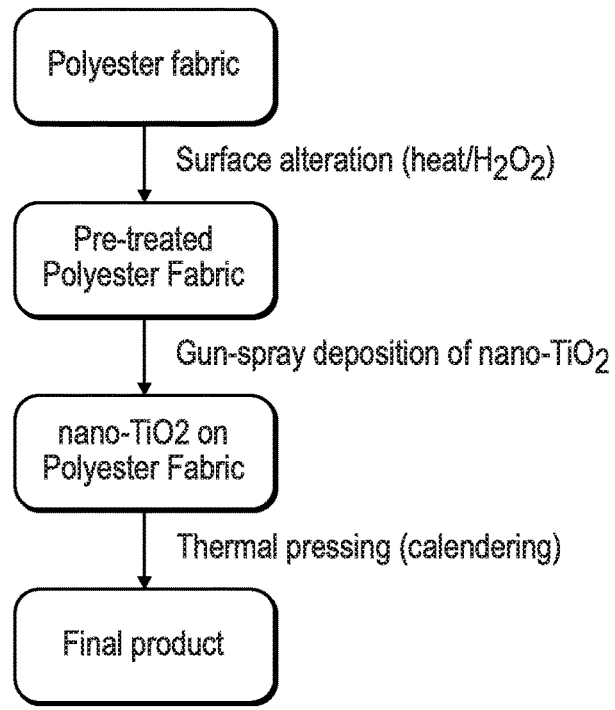
FIG. 3. is a flow diagram of depicting an exemplary method of incorporating/embedding nanoparticles containing inorganic compounds in a surface layer of a polymeric material.

FIG. 3 depicts a flow-diagram of an exemplary method of incorporating/embedding nano-TiO$_2$ within a polyester fabric according to the invention. As depicted in FIG. 1, the surface of the polyester fabric is modified by chemical pre-treatment, followed by heat treatment. Nanoparticles containing TiO$_2$ are deposited onto the modified surface layer using a spray gun. The polymeric article undergoes calendaring process to produce the final product of a polymeric material having nanoparticles uniformly distributed and securely embedded within the surface layer of a single side of the material.

The method of the invention is not limited to polyester fabrics, as shown in FIG. 1. Nanoparticles can be incorporated/embedded within a single surface layer of any thermoplastic polymer using the method described herein. Examples of thermoplastic polymers include, but are not limited to, polyolefins, such as polyethylene, polypropylene, and polybutylene, halogenated polymers, such as polyvinyl chloride, polyesters, such as polyethylene terephthalate, polyester/polyethers, polyamides, such as nylon 6 and nylon 6,6, polyurethanes, polyurea, in addition to acrylic, cellulose rayon, cellulose acetate, aramid, azlon, modacrylic, novoloid, nytril, aramid, spandex, vinyl polymer, vinal, and vinyon, as well as homopolymers, copolymers, or terpolymers in any combination of such monomers. The thermoplastic polymeric substrate can also be a mixture or a blend of one or more of the aforementioned synthetic materials and a natural material such as wool, linen, cotton, silk, or a combination thereof. The thermoplastic polymeric material includes woven and non-woven fabric articles derived from such synthetic fibers, or synthetic/natural blends. Moreover, the substrate can have a flat surface or a three-dimensional texture (e.g., as in synthetic fabrics).

The surface incorporation/embedding of inorganic nanoparticles on the surface of the thermoplastic polymeric material is achieved by taking advantage of the differences in hardness of the thermoplastic material under the heat processing conditions described herein. Thermoplastic polymers will soften when heated above their softening temperature ($T_s$), but will not deform when heated below their melting temperature ($T_m$). The softening point ($T_s$) of a polymer, sometimes referred to as the VICAT softening point, is always above its glass transition temperature ($T_g$) and can be defined by standard industrial methods (i.e., ASTM D 1525 or ISO 306). The nanoparticles (e.g., inorganic nanoparticles) are harder than the softened polymer when above its $T_s$ temperature, so the application of pressure, whether from the distance and/or velocity of a spray-nozzle, or a calendaring process, will allow for firm incorporation of the nanoparticles into the softened surface layer of the polymeric substrate.

The softening of polymer must be restricted to the surface layer only. This can be achieved by defining a temperature window between melting and glass transition temperature ($T_m$-$T_g$) and time duration for which heat has been applied. Too short a time span will end up unsoftened surface or cure quickly thus resulting in poor embedding of nanoparticles.

On the other hand, heating for a prolonged period will create bulk softening which will result in sinking or in a deeper penetration of nanoparticles than desired and the overall microbiocidal efficiency will decrease.

The method of the invention utilizes a lower quantity of nanoparticles as compared to current state of the art spraying or dip-coating techniques, which typically produce a thick, continuous layer of nanoparticles. Such a thick, continuous layer on multiple sides can lead to accelerated degradation of the textile, particularly when the nanoparticle contains a photocatalytic compound which causes photodegredation. As such, the lower quantity of nanoparticles combined with deposition on a single side of the polymeric material, as provided by the method of the invention, results in a nanoparticle-embedded textile having a longer work/shelf-life than those previously described in the art. The quantity of deposited nanoparticles can be controlled by carefully monitoring parameters such as the concentration of nanoparticles in the colloidal suspension deposited on the polymeric surface, the duration of spraying, the distance between the polymeric material and the spray-nozzle, the diameter and shape of the spray-nozzle, and/or the pressure applied to the spray-nozzle.

The nanoparticle embedded polymeric materials produced by the method described herein are wash-durable/wash-resistant, such that the polymeric material retains its antimicrobial characteristics after repeated washes.

At least 80% of nanoparticles remain in polymeric material after 10 washes, at least 75% of nanoparticles remain in the polymeric material after 40 washes. Where 80% is from 4-80 µg/cm$^2$ and 75% is 3.75-75 µg/cm$^2$ of nanoparticles on the polymeric surface.

Nanoparticles Containing a Microbiocidal Agent

The nanoparticles deposited and embedded within the single surface layer of a polymeric material contain a microbiocidal agent, thereby imparting antimicrobial properties to the polymeric material. The microbiocidal agent is preferably an inorganic compound. Certain inorganic compounds have been shown to display non-specific microbiocidal and/or fungicidal activity, and can thus kill a broad spectrum or microorganisms. Examples of such inorganic compounds include, without limitation, gold, copper, zinc, iron, silver, titanium, and rare earth elements including the lanthanoids (e.g., Scandium, Yttrium, Lanthanum, Cerium, Praseodymium, Neodymium, Promethium, Samarium, Europium, Gadolinium, Terbium, Dysprosium, Holmium, Erbium, Thulium, Ytterbium, Lutetium), Scandium and Yttrium.

Additionally, some inorganic compound formulations have been shown to display photocatalytic activity against common pathogenic microorganisms, including but not limited to *Escherichia coli, Pseudomonas aeruginosa, Klebsiella pneumoniae, Salmonella* sp., *Listeria monocytogenes, Bacillus anthracis, Bacillus subtilis, Candida albicans, Staphylococcus aureus* thus allowing for the design of self-sterilizing/self-disinfecting polymeric textiles. These photocatalytic compounds are excited by photons within visible range (380 or 400 nanometers to about 760 or 780 nm), ultraviolet range (e.g., UVA (315 nm-400 nm) or UVB (280 nm-315 nm) or the infrared range (0.7 micrometers to 300 micrometers) of the electromagnetic spectrum, depending on the compound or formulation thereof. Examples of such photocatalytic compounds include, but are not limited to, $TiO_2$, $Ag_2O$, $Ag$—$TiO_2$, $ZnO$, $Fe_2O_3$, $ZnFe_2O_4$, $SiO_2$, $CeO_2$, $La_2O_3$, $Eu_2O_3$, $Fe_2O_3.TiO_2$ or a combination thereof. Such photoctalysts can come in pristine form, as a mixture of different morphologies and structure (e.g. a 80:20 anatase $TiO_2$: rutile $TiO_2$, or$_a$ core-shell morphology), as heterostructures (e.g. $Fe_2O_3.TiO_2$), or as doped with metallic (e.g. V, Mn, Fe, Ag, Cr, Au) or nonmetallic (e.g. S, N, Cl, I, F) ions or defects (e.g. a vacancy).

One or more of such microbiocidal and/or photocatalytic inorganic compounds can be included in a formulation for nanoparticle synthesis. Nanoparticles containing such inorganic compounds or formulations can be synthesized as a micellar composition, a colloidal composition, or a sol-gel composition, using methods known to those skilled in the art (see e.g., Whitesides, G. M. et al. (1991). Molecular self-assembly and Nanochemistry: A chemical Strategy for synthesis of Nanostructures, *Science* 254:1312; Brinker, C. J.; G. W. Schere (1990) Sol-Gel Science: *The Physics and Chemistry of Sol-Gel Processing*, Academic Press; Sun, Y; Xia, Y. (2002). Shape controlled synthesis of gold and silver nanoparticles, *Science,* 298 (5601); 2176-9). Once the nanoparticles are synthesized, a suspension is prepared (e.g., using distilled water and thorough mixing) for deposition on or a surface layer of a single side of a polymeric material, as previously described.

Secure incorporation of such photocatalytic inorganic nanoparticles within the outermost surface layer of a polymeric material, as described above, is important to achieve sufficient microbiocidal activity, especially when using a lower quantity of nanoparticles, as provided by the method described herein. The nanoparticles must firmly reside within the outermost surface layer in order to be sufficiently photo-activated. Thus, previous methods by which yarns, threads or fibers are coated in, for example, $Ag_2O$ or $TiO_2$, or are melt spun to incorporate such inorganic compounds, and are then used to weave or knit a fabric article or textile, do not yield sufficient self-sterilizing activity due to a lack of surface exposure.

Photo-Sterilizers

Light illuminators can be used to photo-sterilize textiles having photocatalytic nanoparticles embedded within a surface layer of the textile. The light illuminator can be a Light Emission Diode (LED) illuminator, UV Lamp illuminator, an Infrared (IR) illuminator (equipped for UVA, UVB or both). The skilled artisan will recognize that the particular light illuminator will depend on the absorption and activation properties of the photocatalytic compound embedded within the polymeric material. For example, a violet/blue LED illuminator can be used to photoactivate nano-$TiO_2$ containing polymeric materials, as described below in Example 2. In certain embodiments, an LED illuminator equipped with blue, green, red and white LEDs, covering a spectrum of 450-680 nm (red 610-650 nm, green 492-550 nm, blue 450-495 nm, and white LED 440-680 nm), can be used to photoactivate a variety of photocatalytic nanoparticles. Different combinations of light illuminators, such as LED and UV illumination, can also be designed to selectively excite photocatalytic nanoparticle embedded in polymeric textiles.

The invention having now been described by way of written description, those of skill in the art will recognize that the invention can be practiced in a variety of embodiments and that the foregoing description and examples below are for purposes of illustration and not limitation of the claims that follow.

EXAMPLES

The following examples, including the experiments conducted and results achieved are provided for illustrative purposes only and are not to be construed as limiting upon the present invention.

Example 1

Figure 4:
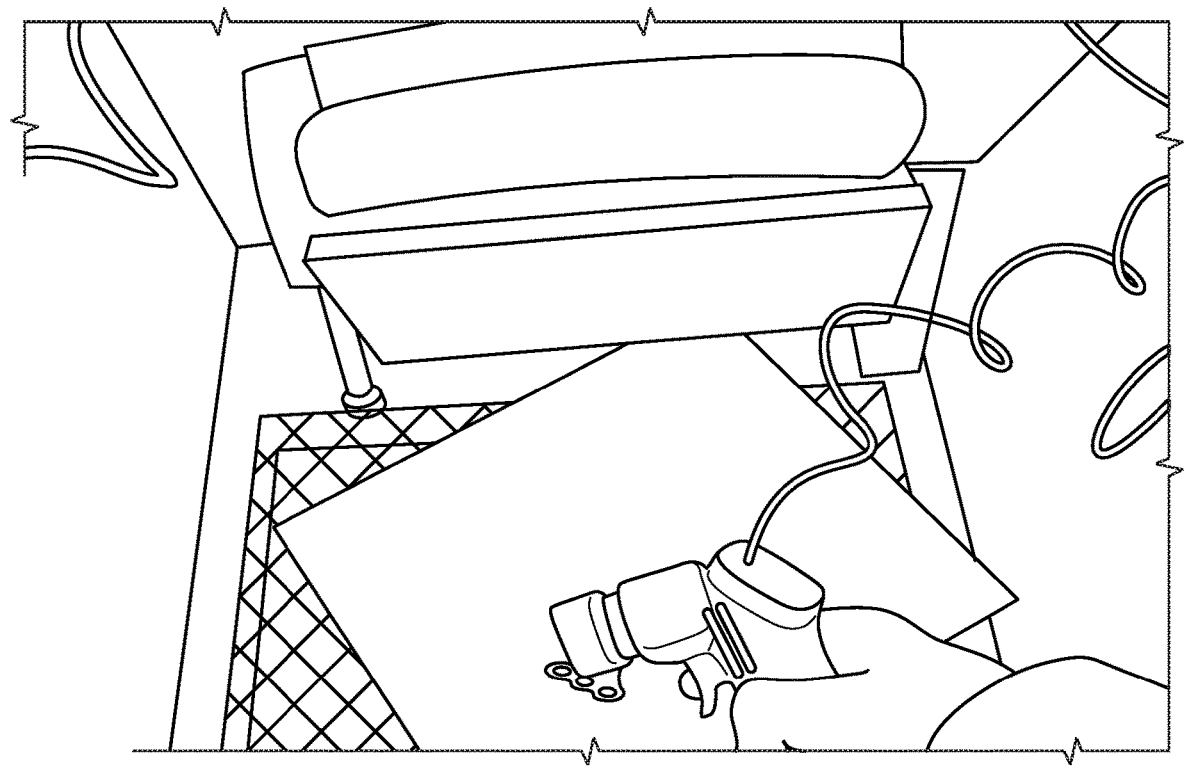
FIG. 4. depicts a polymeric material positioned in hot plate compartment for nanoparticle deposition and heat treatment.

Producing a Nanoparticle-Embedded Polymeric Textile a. with Chemical Pre-Treatment Followed by Manual Spraying, Heating and Pressing A thermoplastic polymeric fabric material (polyester fabric) was pre-treated with hydrogen peroxide on a single side of the material. The material was then positioned and clamped to a metal board. This set-up was then placed in a hot plate apparatus within a protective chamber (see FIG. 4). Heat was applied to a top plate positioned horizontally to the pre-treated side of the fabric.

Figure 5:
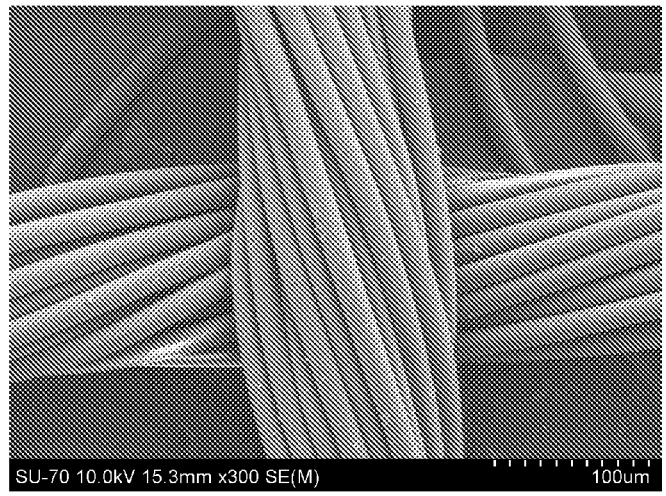
FIG. 5. depicts a Scanning Electron Microscopy (SEM) image of an uncoated (i.e., no nanoparticles) polyester fabric—reference sample.
Figure 6:
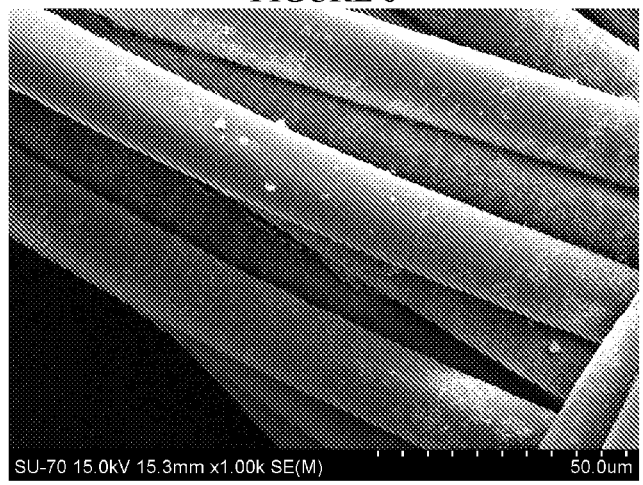
FIG. 6. depicts an SEM image of a non-continuous coating of $TiO_2$ nanoparticles on polyester fabric (one-sided coating).
Figure 7:
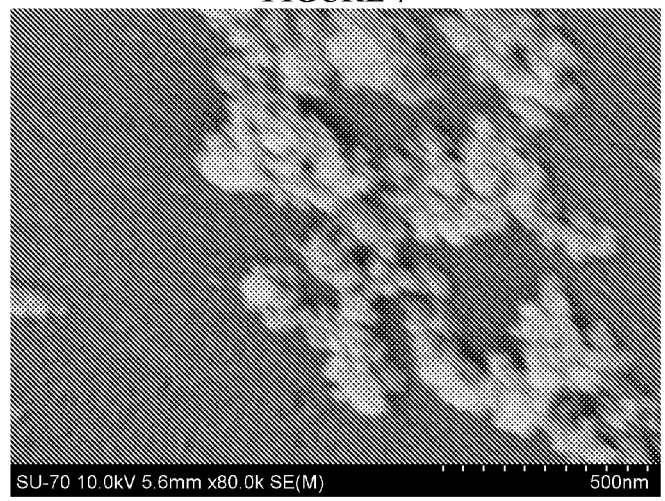
FIG. 7. depicts a magnified SEM image of Magnification of the $TiO_2$ nanoparticles on polyester fabric ($TiO_2$—white color).
Figure 8:
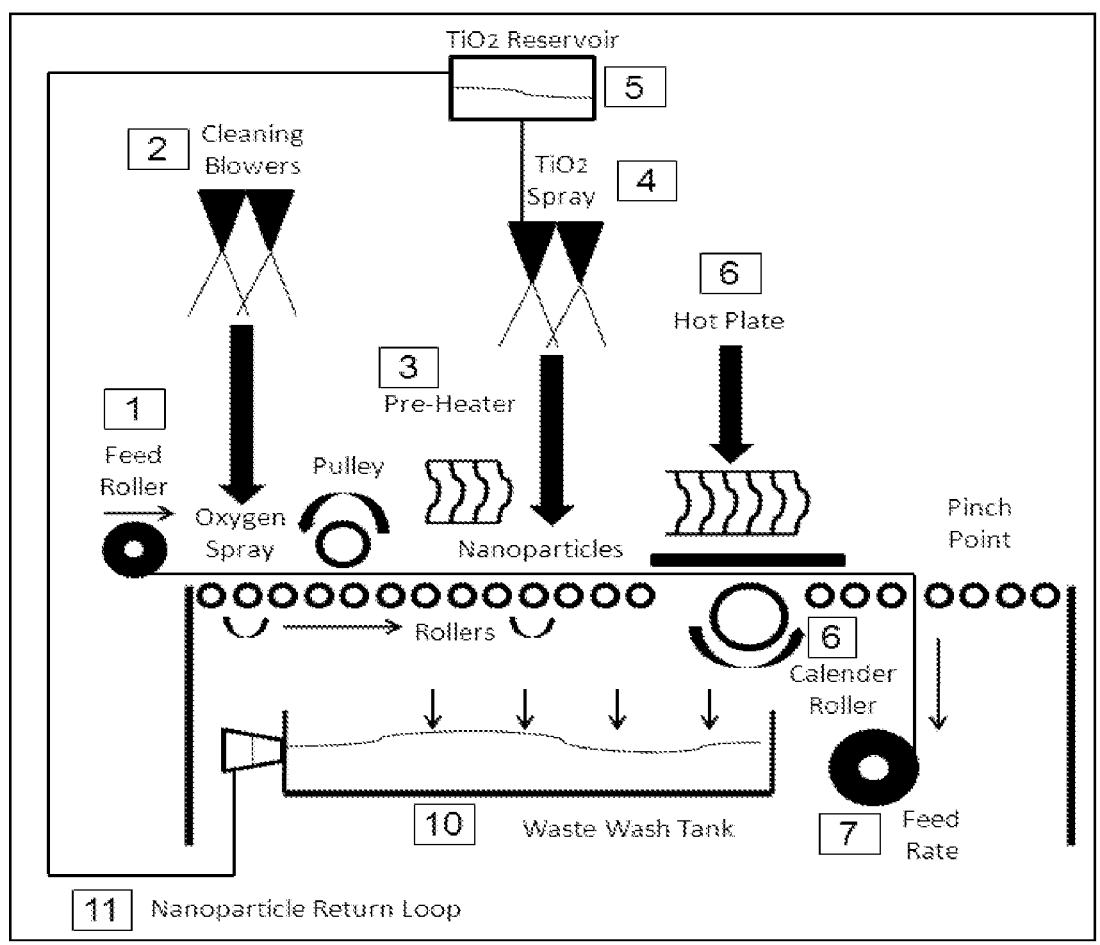
FIG. 8. represents a schematic of a fully-automatic rig:
 1. Feed Roller
 2. Cleaning Blowers
 3. Pre-Heater
 4. Nanoparticle ($TiO_2$) spray
 5. Nanoparticle ($TiO_2$) reservoir
 6. Hot Plate and calendar roller
 7. Feed rate
 8. Rollers
 9. Pinch point
 10. Waste wash tank
 11. Nanoparticle return loop FIG. 9. is a longitudinal view of fully-automatic nanoparticle embedding rig.
Figure 9:
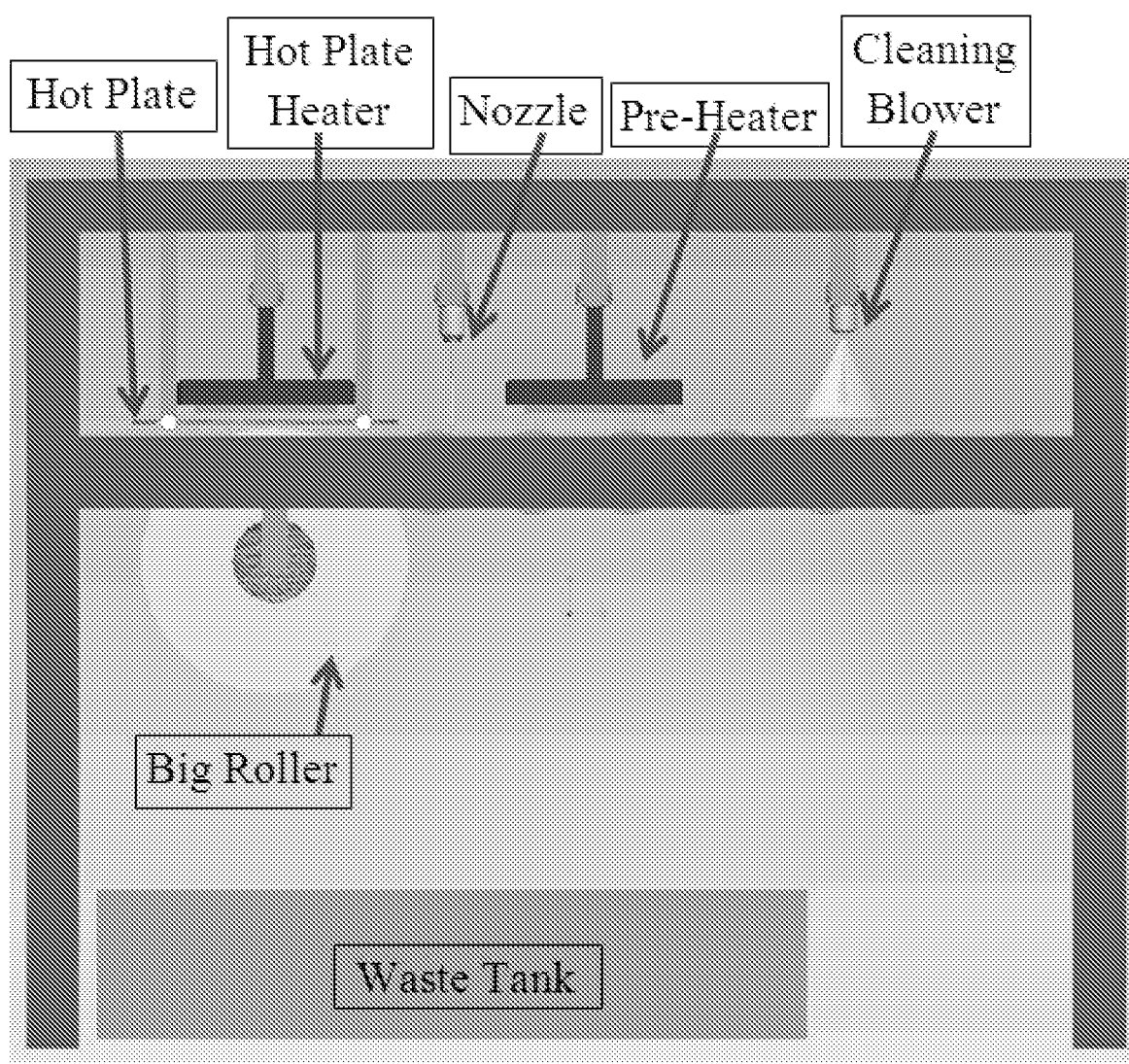
Figure 10:
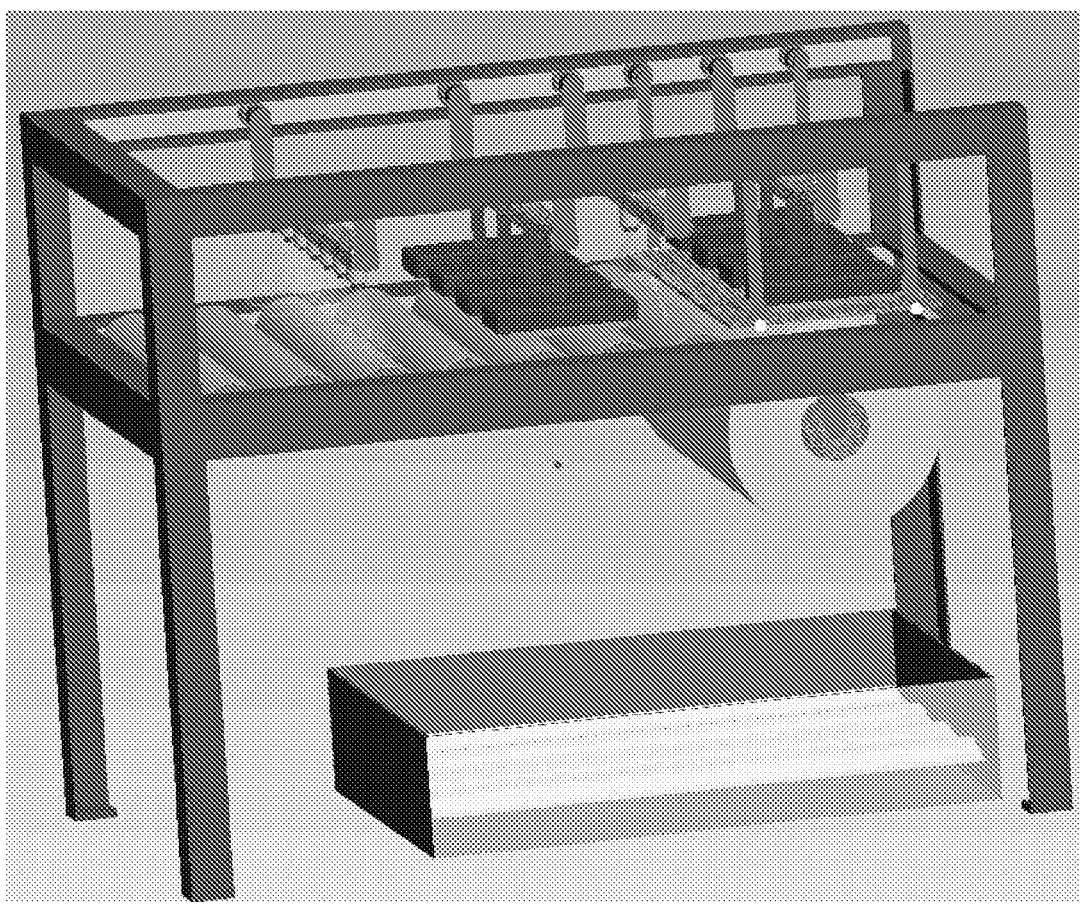
FIG. 10. is a 3-D view of the fully automatic nanoparticle embedding rig.
Figure 11:
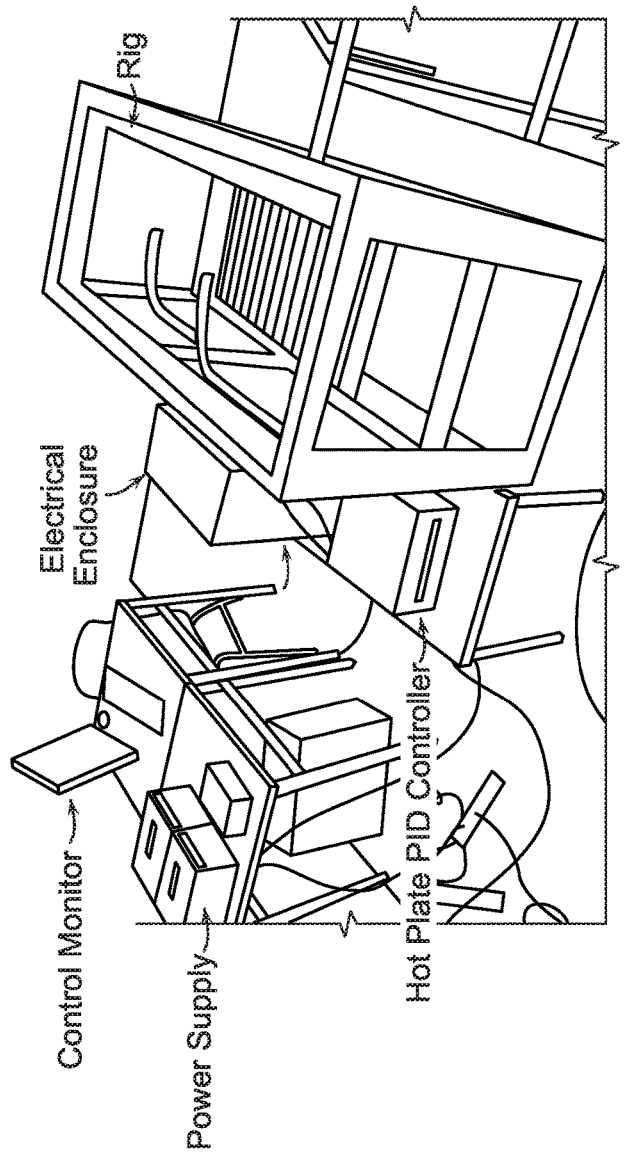
FIG. 11. is a general view of a prototype fully automatic embedding rig.
Figure 12:
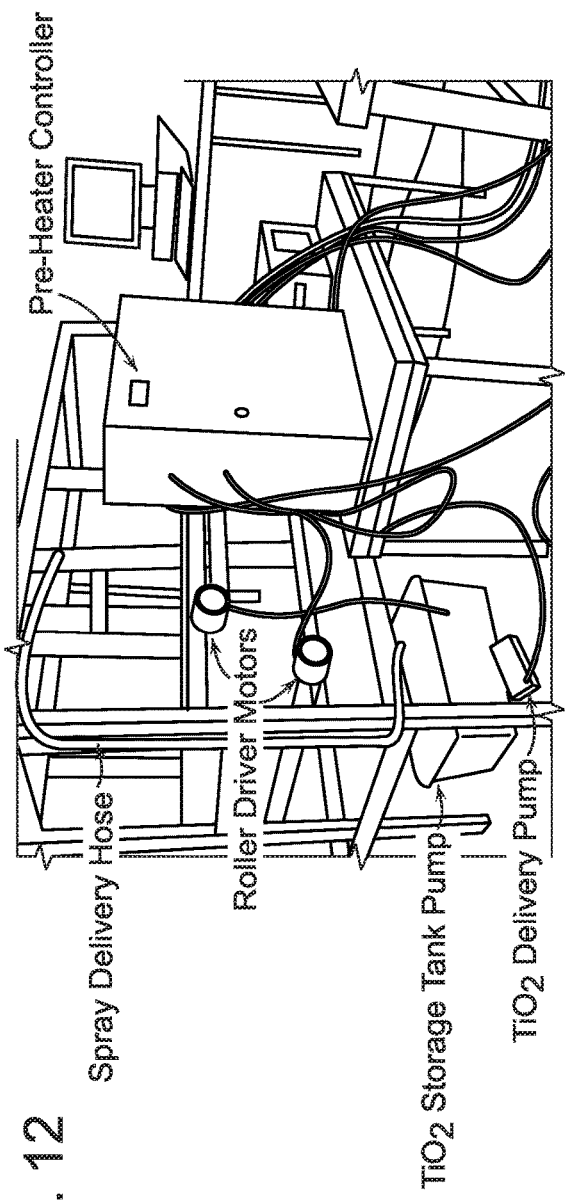
FIG. 12. is a prototype rig assembly displaying stepper motors and nanoparticle delivery system.
Figure 13:
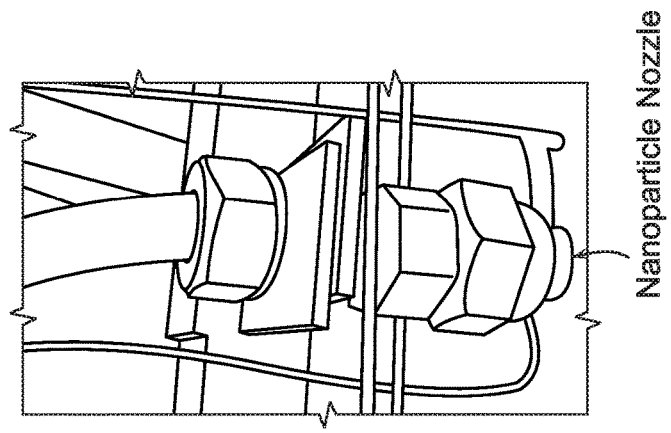
FIG. 13. is a longitudinal view of embedding process, fabric feed roller (left), and nanoparticle spray nozzle (right).
Figure 14:
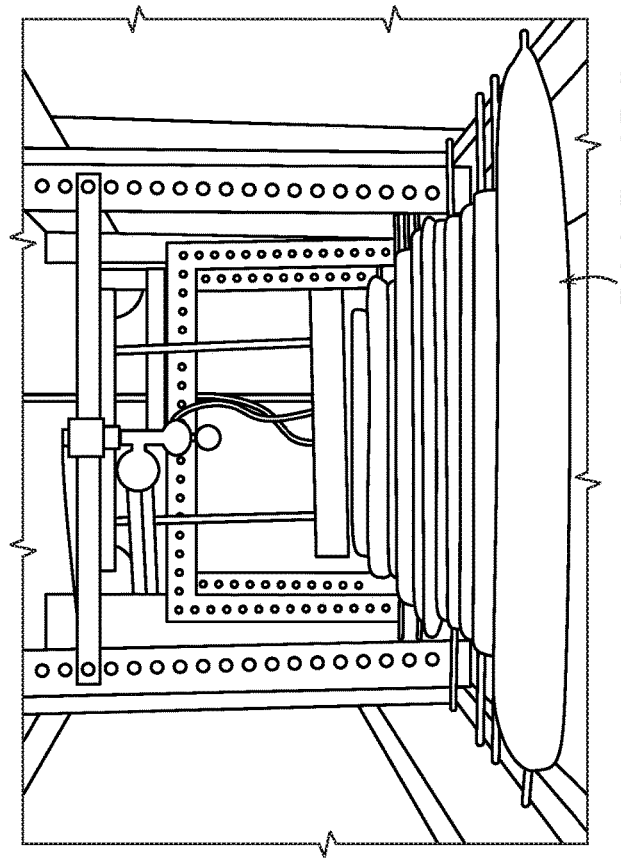
FIG. 14. is a longitudinal view of the pre-heater and spring loaded hot-plate assembly.

A spray-nozzle containing a $TiO_2$ nanoparticle suspension was positioned approximately 150 mm from the fabric surface and operated for 1 second in a right to left direction. Immediately after spraying, the hot plate was pressed onto the treated fabric for two minutes. The material was then placed in a sealed container. The preferred processing parameters were as follows:

- Volume of spray-nozzle container—25 ml
- Solution concentration—4.4 wt. % $TiO_2$ in water (Aerodisp® W740X, Evonik-Degussa)
- Heating temperature of hot-plate (processing temperature)—142° C.
- Heating time after clamping—2 minutes
- Spraying pressure—8 Bar
- Spraying time—1 second
- Nozzle distance from sample—ca. 15 cm
- Length and width of sample—10 cm×5.5 cm
- Fabric—polyester FIGS. 5-7 show Scanning Electron Microscopy images of the polyester fabric obtained after processing by the procedure described above. A sample of polyester fabric without titania nanoparticles is presented in FIG. 5. FIGS. 6 and 7 show the distribution and size of the $TiO_2$ nanoparticles deposited on the polyester fabric.

b. Closed loop Automatic Embedding of $TiO_2$ and A—$TiO_2$ Nanoparticles into Polymeric Textiles An automatic, prototype rig has been designed and constructed to integrate the nanoparticle embedding process into one single unit for finishing operation with the following features as described in FIGS. 8-15

- A closed loop system, where excess nanoparticles sprayed can be recycled back into the process, whereby efficiently using the spraying of nanoparticles.
- Isolating the operator from the spray of nanoparticles by putting in protective enclosures.
- Isolating the spraying of nanoparticles from uncontrolled interferences that would affect distribution and embedding to the polymeric material, e.g. interference from influences such as a draft or a wind flow, and contamination including dust particles.

c. Automatic Spraying, Heating and Pressing but with No Chemical Pre-Treatment

The automatic embedding process can be better understood with the help of the diagrams given in FIGS. 1, 8, 11-15 and the step by step description given below:

1. The polymeric material is positioned on a feed-roller (FR), where it is fed through the embedding process.
2. A cleaning blower (CB) is used to remove dust and loose particles present on the polymeric material surface, and is extracted to the atmosphere. For this compressed air at a given pressure is blown over the polymeric material so that loose contaminants and particles on the surface of the polymeric material is removed. The compressed air flow is controlled by a solenoid valve.
3. The polymeric material is pre-heated. In the example it is conducted by a ceramic heater in contact mode but alternative heating by radiation heating, hot air blow or hot water or steam injection is also possible. The temperature is monitored a thermistor probe positioned at the centre of the pre-heater, directly under the fabric. The thermistor sends feed-back to a digital electronic thermo-controller, with a given set-point. Alternative temperature measurements such as Infra-red temperature sensing are also possible.
4. The nanoparticles are kept in a colloidal state in water within polypropylene container but this can vary according to manufacturers' specification. A magnetic/mechanical stirrer keeps the solution mixed.
5. A pressure boost pump delivers the nanoparticles containing water through a polyurethane tubing. The tubing is fed to an even-fan spray nozzle. The nozzle sprays nanoparticles onto the polymeric material through an angle at a predetermined flow rate set in the nozzle by the pressure of nanoparticles containing water stream delivered from the boost pump.
6. During this time, the polymeric material is automatically fed and pinched between a hot-plate (HP) and a calendar-roller (CR) as shown in FIG. xx. The polymeric material is driven between the CR and HP with the help of a stepper motor connected to the CR. A thermocouple is positioned on the underside of the HP and connected to a digital controller which has a set-point controlled by the operator. Two springs with the same stiffness are positioned on the HP and maintain the fabrics pinch between the HP and CR. The CR can be made from any material that does not contain oxidising materials. Steel and cotton rollers have been used in this example but other similar materials and even ceramic rollers can be used.
7. Embedded polymeric material is retrieved on a FR that pivots on bearings located at its ends.
   A stepper motor drives the FR by pulling the polymeric material through a pinch located between the HP and CR.
8. An industrial pre-wash cycle can be conducted either prior to or after the front rolling. The wash cycle will get rid of the unbound or loosely bound nanoparticles which can be collected at a bottom trough and then feed back into the feed-nozzle to have a close loop system.

FIG. 15 describes the range of parameters that can be used for this close loop set up as examples but not limited to these parameters.

Example 2

Photosterilization of Polymeric Textiles with Manually Embedded Nanoparticles $TiO_2$ and Ag—$TiO_2$ were embedded in PET fabrics following the schema in FIG. 1, but using the manual process as described in Example 1a.

$TiO_2$ doped materials exhibit significant absorption band in UV spectral region, with maximum absorption at 360-390 nm. After illumination of $TiO_2$-polymeric materials by UV light (365 nm), significant and strong photocatalytic properties can be observed. Moreover, nano-$TiO_2$ materials doped by Ag exhibit antimicrobial properties after illumination by light with wavelength around 415-430 nm. This kind of nanomaterial exhibits antimicrobial activity and can be used to prepare various textiles, which can be able to sterilized themselves after UV and violet light illumination.

This example shows that antimicrobial activity can be achieved by using UV bulb lamps with the emission maximum at 365 nm. In another words, it is possible to perform photosterilization of nanoparticle-embedded textiles.

Figure 16:
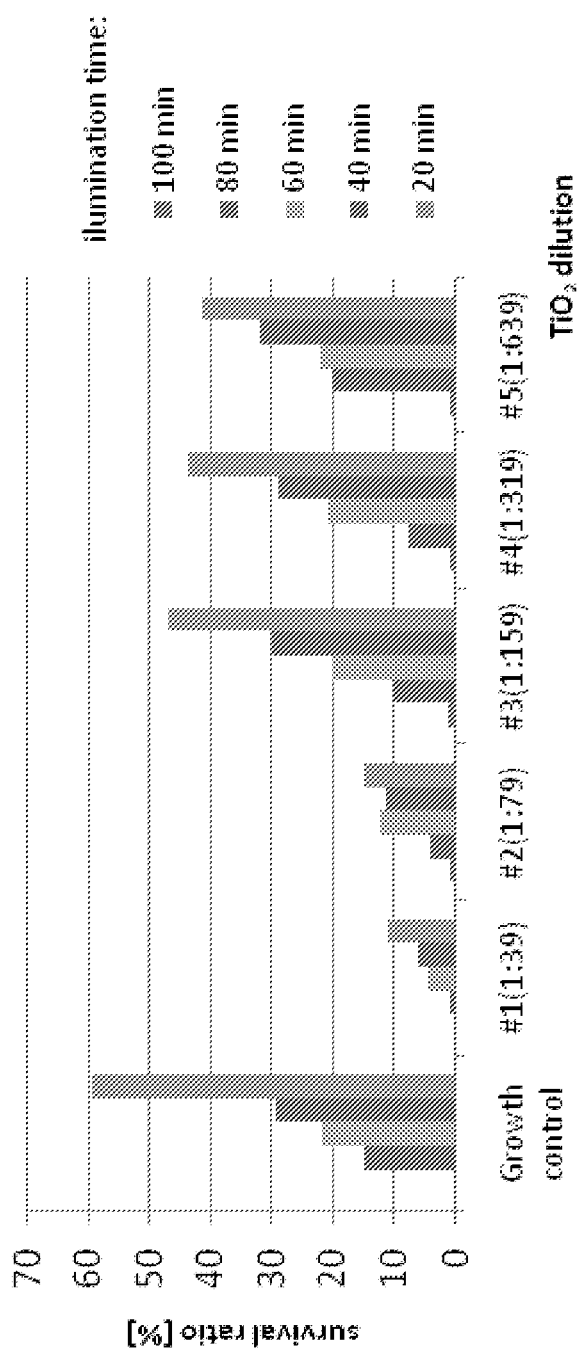
FIG. 16. is a bar graph depicting $S.$ $aureus$ (MRSA)—survival on $TiO_2$ embedded textiles under light (365 nm, GP 1.5 $mW/cm^2$).
Figure 17:
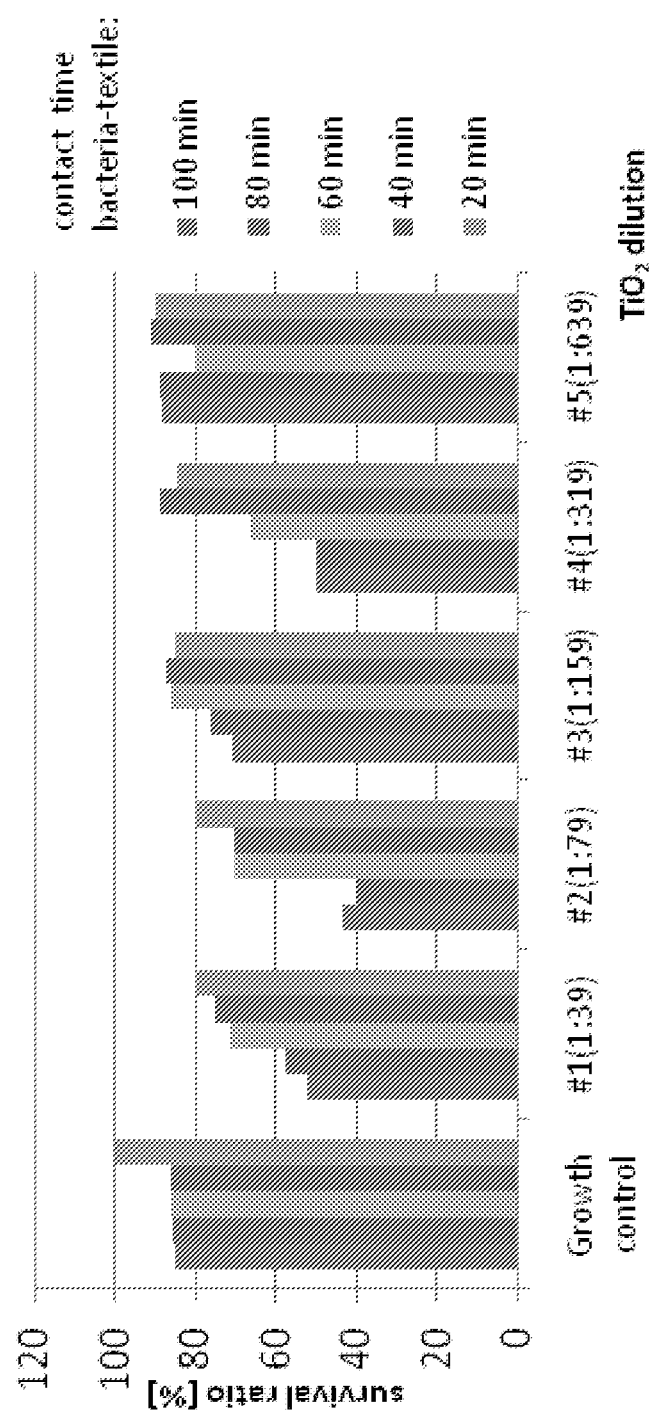
FIG. 17. is a bar graph depicting $S.$ $aureus$ (MRSA)—survival on $TiO_2$ embedded textiles in the dark.

The survival ratio (SR) of methicillin resistant *S. aureus* (MRSA) on $TiO_2$ coated polymeric fabrics decreased progressively depending on exposure time and the number of nanoparticles immobilized on the fibers (FIG. 16). After 20 min of photo-excitation, it was possible to reduce bacterial growth to 10% and then, after 80 minutes—to 0.7%. Therefore, the induced oxidative stress was sufficient for an effective inactivation of this multidrug resistant bacteria with the thick cell wall. In contrast, the survival ratio of staphylococci kept in room temperature (RT) in a dark field never fell below 40% for all samples at any time showing inherent anti-MRSA nature (FIG. 17).

Figure 18:
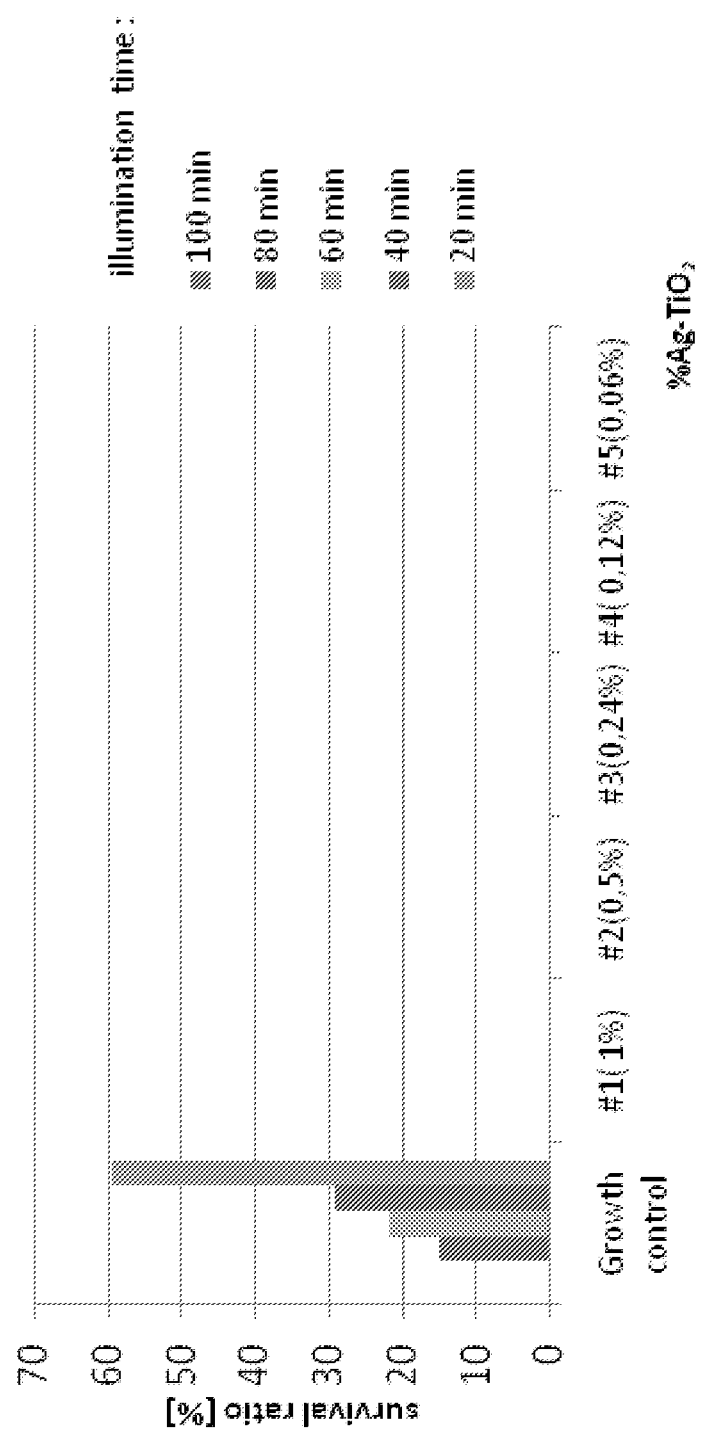
FIG. 18. is a bar graph depicting $S.$ $aureus$ (MRSA)—survival on $Ag$—$TiO_2$ textiles under light (365 nm, GP 1.5 $mW/cm^2$).
Figure 19:
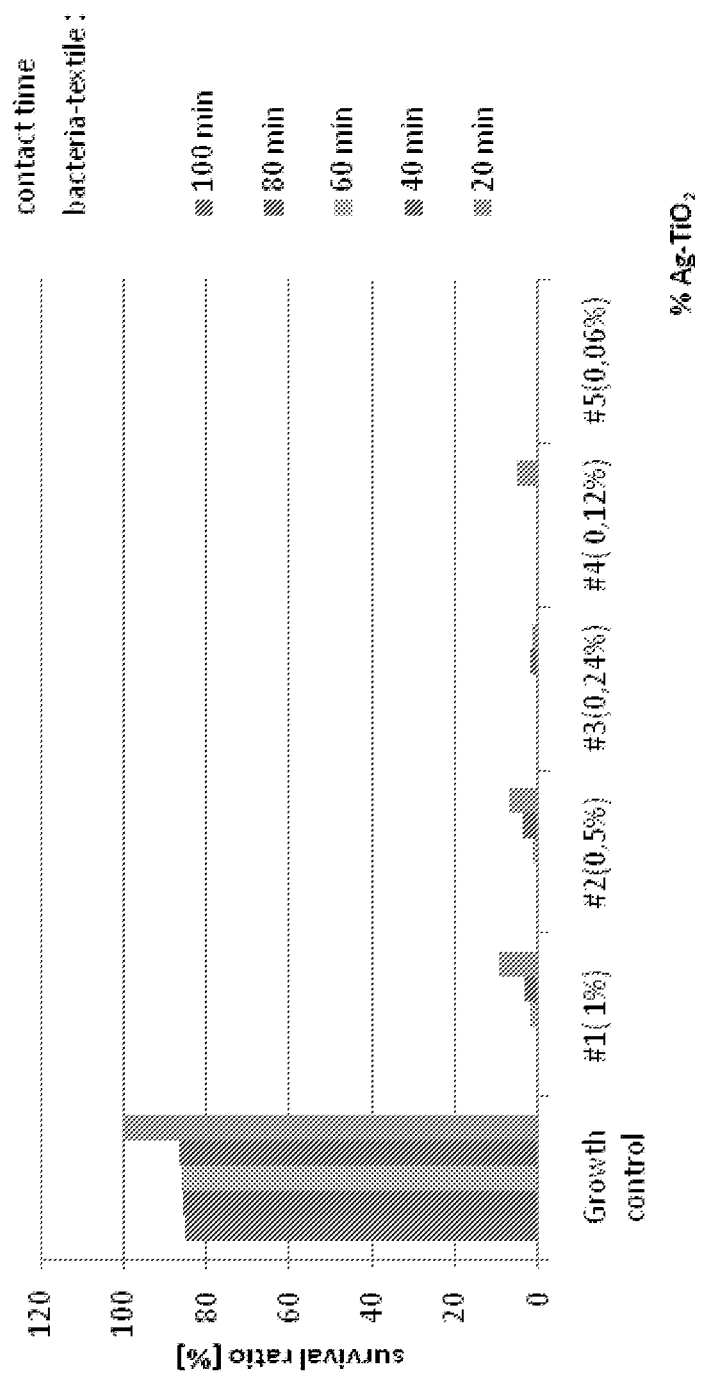
FIG. 19. is a bar graph depicting $S.$ $aureus$ (MRSA)—survival on $Ag$—$TiO_2$ textiles in the dark.
Figure 20:
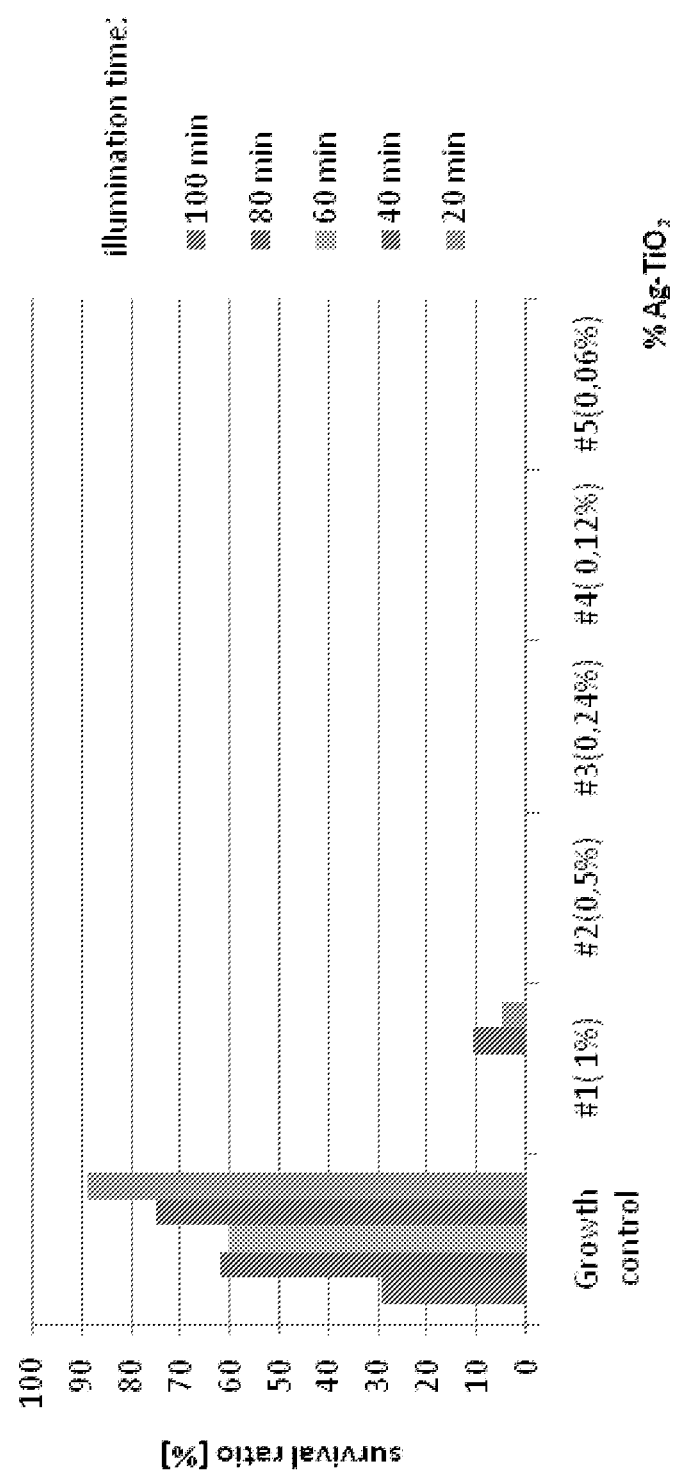
FIG. 20. is a bar graph depicting $E.$ $coli$ (ESBL) survival on $Ag$—$TiO_2$ textiles under light (365 nm, GP 1.5 $mW/cm^2$).
Figure 21:
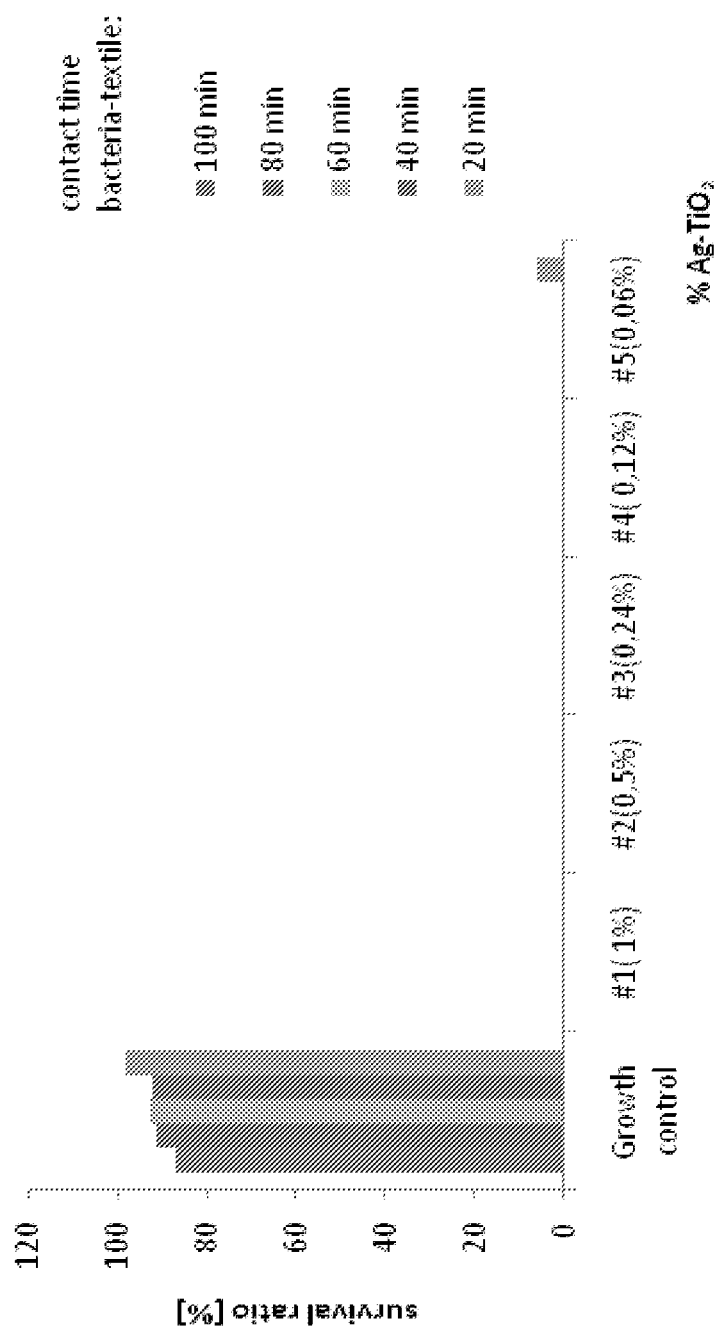
FIG. 21. is a bar graph depicting $E.$ $coli$ (ESBL) survival on $Ag$—$TiO_2$ textiles in the dark.

Time-dependent microbial survival ratios indicated the excellent sterilization performance of Ag doped $TiO_2$ fabrics, on Gram-positive and Gram-negative bacteria. The SR of MRSA (FIG. 18) and *E. coli* ESBL (FIG. 20) under UVA irradiation went to 0% within 20 min. Similar results were obtained in the dark field for the SR of MRSA and *E. coli* (FIG. 19, FIG. 21).

Figure 22:
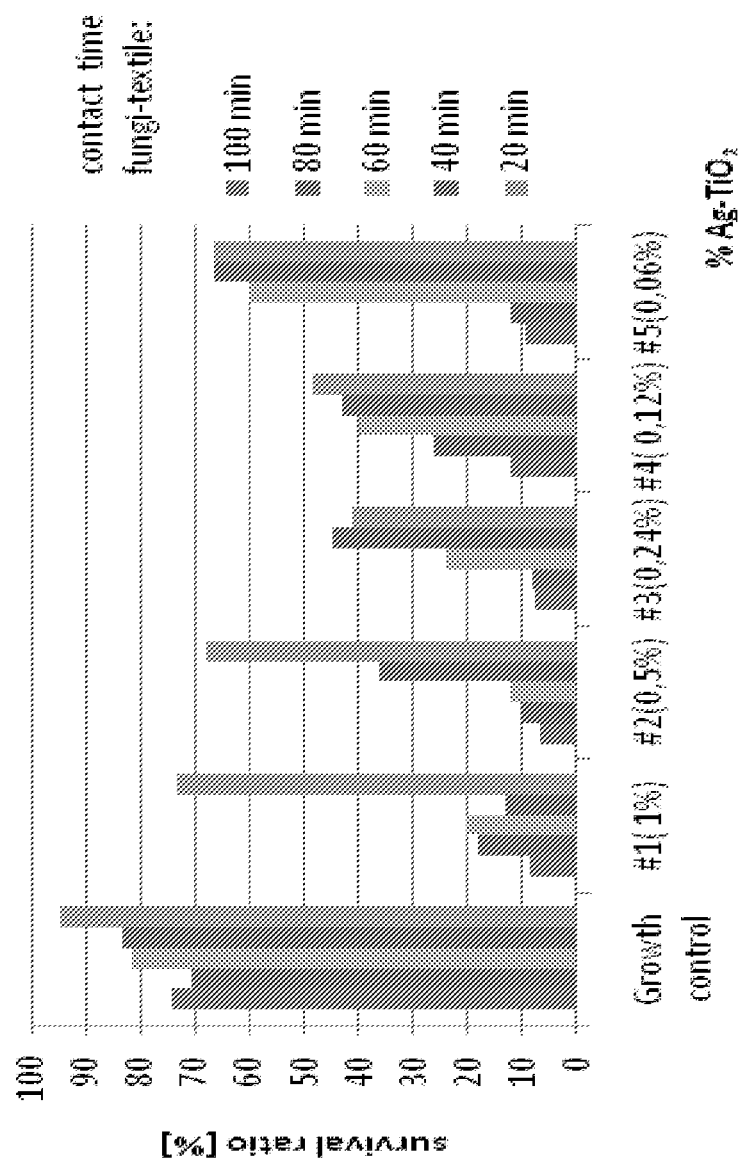
FIG. 22. is a bar graph depicting $C.$ $albicans$—survival on $Ag$—$TiO_2$ textiles under light (365 nm, GP 1.5 $mW/cm^2$).
Figure 23:
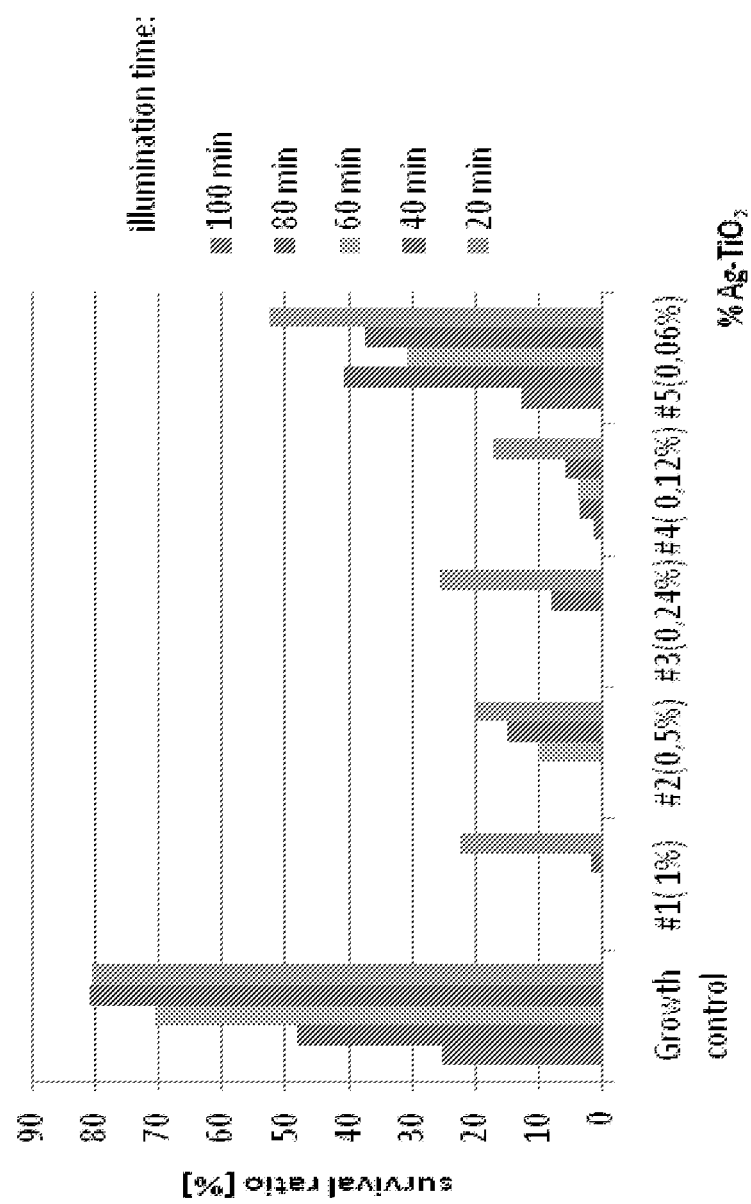
FIG. 23. is a bar graph depicting $C.$ $albicans$—survival on $Ag$—$TiO_2$ textiles in the dark.

Good sterilization effect (SR—0%) for *Candida albicans* was achieved within 60-80 min irradiation of Ag—$TiO_2$ impregnated fabrics (FIG. 22). Opposite to the bacterial strains, the growth of fungi was inhibited significantly in the dark field, but never fell to 0% (FIG. 23).

Two different photo-excitation arrangements can be combined (e.g., LED and UV illumination) in order to be able to perform sterilization of textile with entrapped $TiO_2$ based materials. Such kind of textiles can be used in production of hospital garments and laundry, therefore the such an illuminator design can be used commercially as a photo-sterilizer, for example, in hospitals, clinics and nursing homes.

Example 3

Effect of Temperature on the Bonding of TiO2 Nanoparticles in PET

Figure 24:
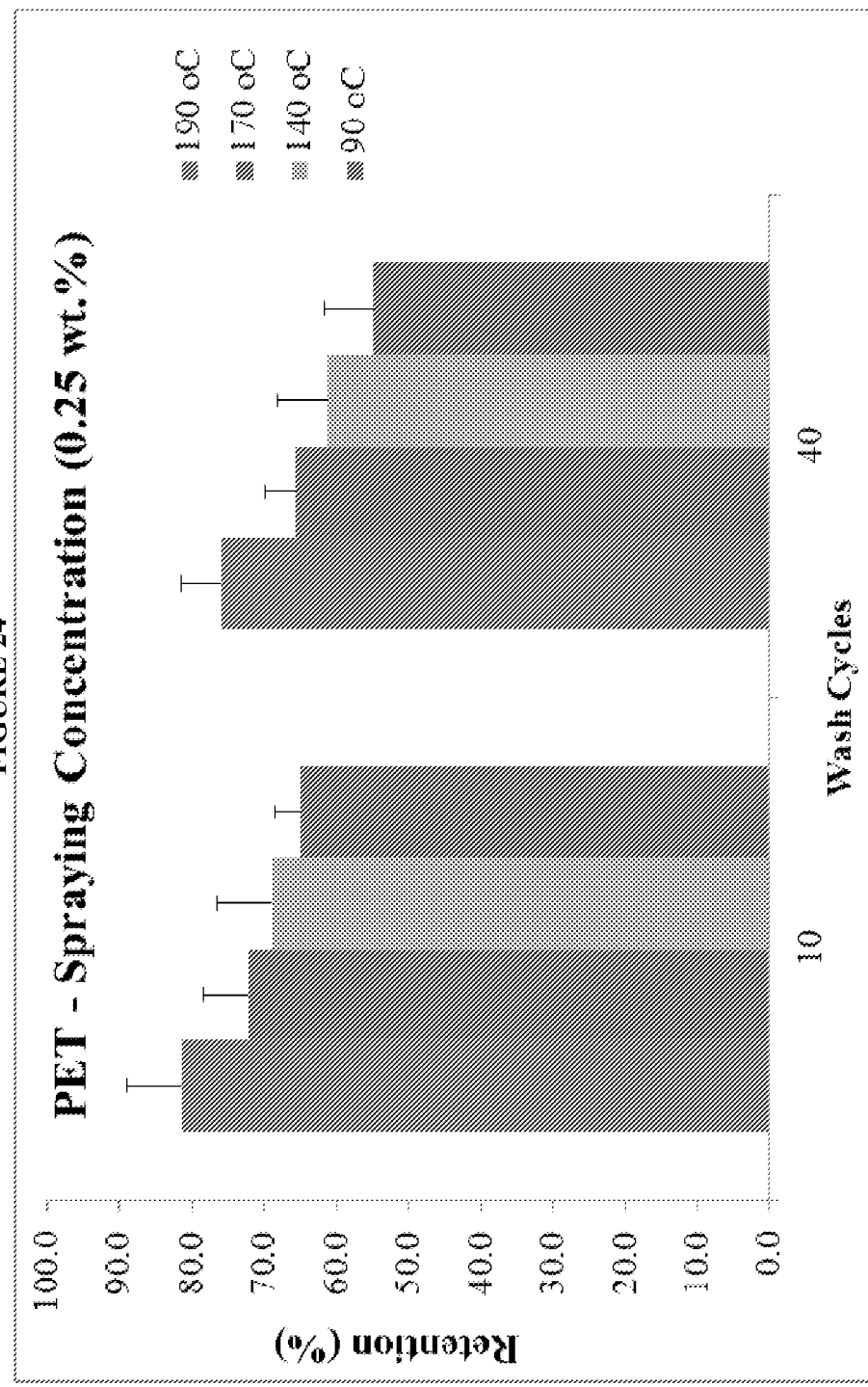
FIG. 24. Effect of hot-plate temperature on the bonding to polymeric materials after 10 & 40 wash cycles (including 1 pre-wash cycle).
Figure 25:
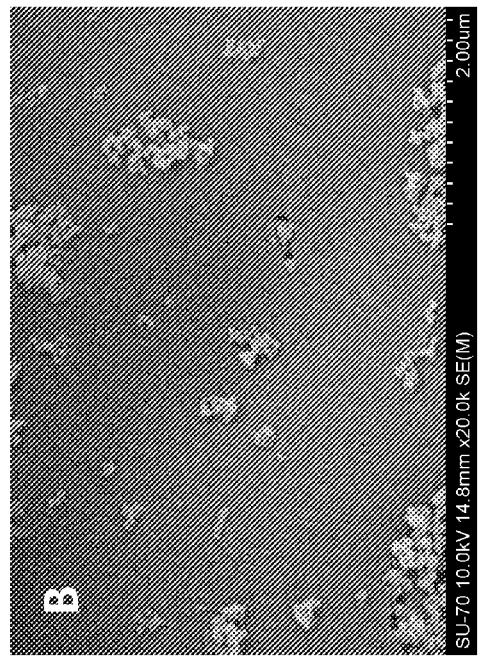
FIG. 25. SEM micrographs of $TiO_2$ nanoparticles incorporated into surface layer of PET fabric. (A)—distribution of $TiO_2$ nanoparticles in patches on PET surface; (B)—representative magnified image (C) a magnified view of B showing the spacings between different patches of embedded nanoparticles.
Figure 25:
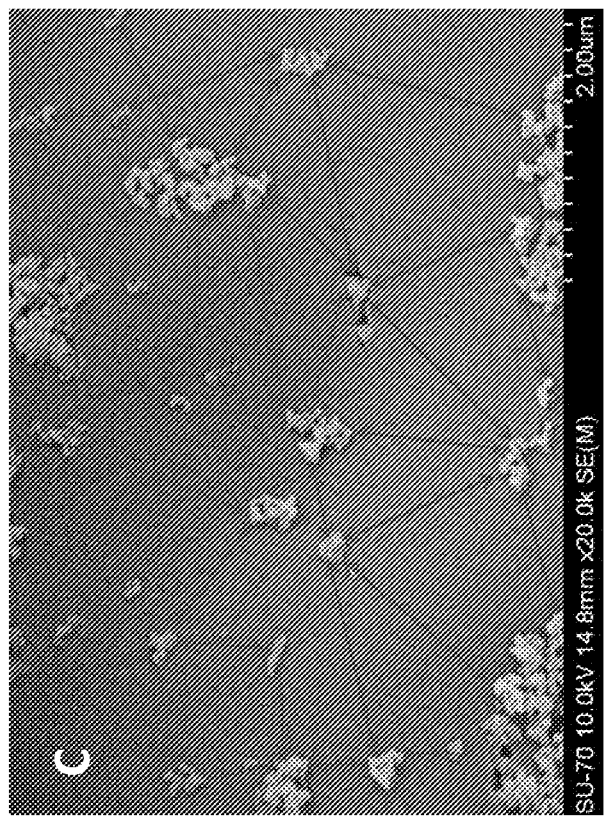
Figure 25:
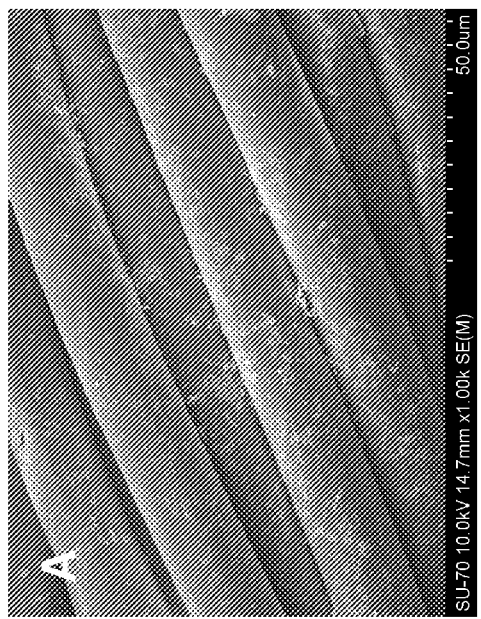

This example illustrates the effect of hot-plate temperature on the bonding strength of nanoparticles to the polymeric material. PET was used as a the polymeric material, with a nanoparticle concentration of 0.25 wt. % nanoparticles sprayed. Nanoparticles were measured as percentage retention by characterization techniques. Polymeric materials were measured for nanoparticle retention after 10 and 40 washing cycles of a domestic laundering machine (including a pre-wash cycle to remove loose nanoparticles), in accordance with BS EN ISO 6330-2000. Hot-plate temperature embedding at 190° C. displays the highest retention of nanoparticles. Nanoparticle retention decreases as the hot-plate temperature decreases. The increase in laundering cycles from 10 to 40 also highlights the positive effect that increasing hot-plate temperature has on nanoparticle retention (FIGS. 24-25).

$TiO^2$ nanoparticles of Degussa Aerosil W741X deposited on PET material resulted in the following surface concentration at the various embedding temperatures 190° C. temperature of embedding deposited a surface concentration of 16 μg/cm².
170° C. temperature of embedding deposited a surface concentration of 16 μg/cm².
140° C. temperature of embedding deposited a surface concentration of 14 μg/cm².
90° C. temperature of embedding deposited a surface concentration of 11 μg/cm².

Example 4

Figure 26:
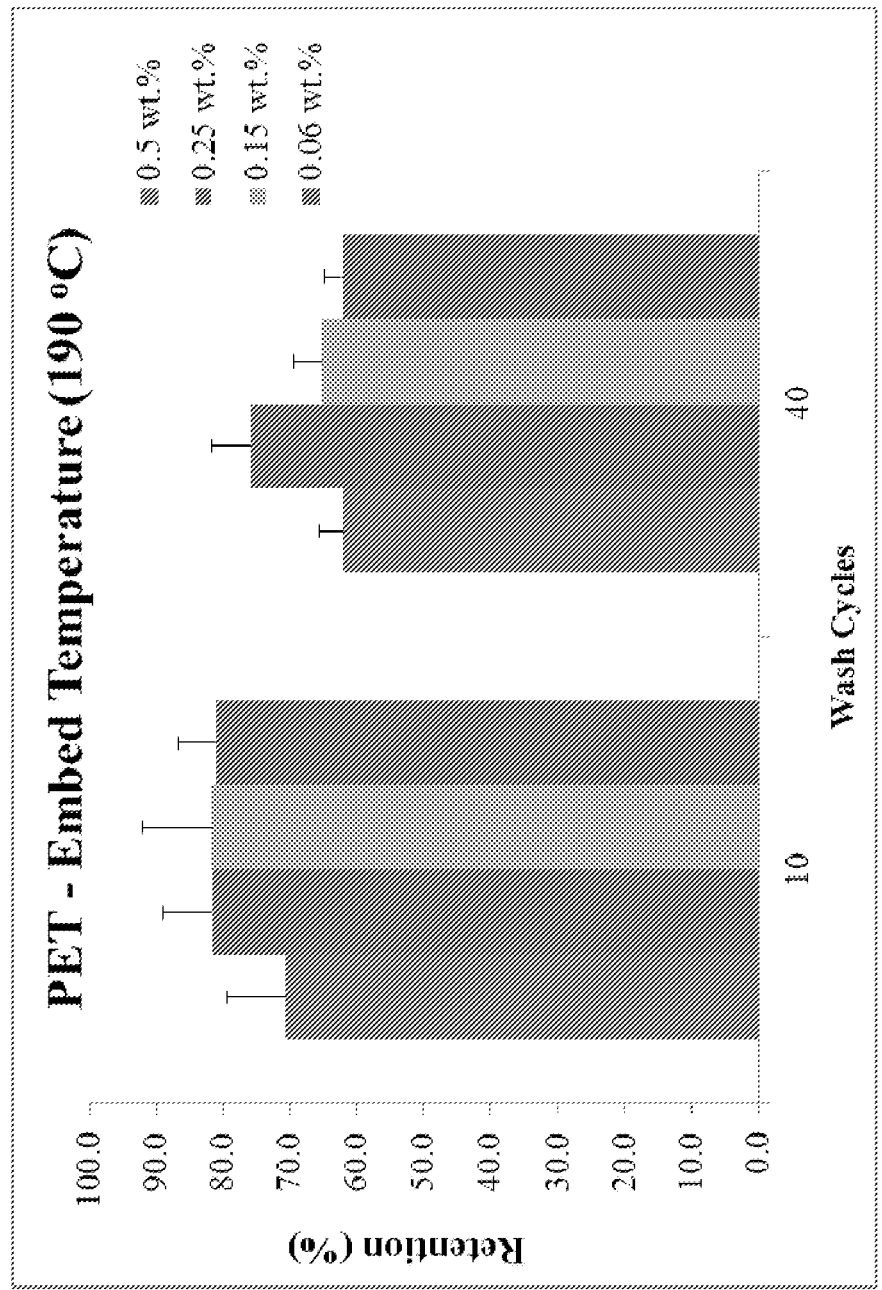
FIG. 26. Effect of starting concentration of $TiO_2$ in the colloidal suspension on bonding of these nanoparticles to PET.

Effect of Starting Concentration of Titania (dilution) on Bonding of TiO2 Nanoparticles in PET This example illustrates the effect of nanoparticle concentration applied by spraying to a polymeric material. PET is used as the polymeric material and the hot-plate temperature is set at 190° C. Nanoparticles were measured as percentage retention by characterization techniques. Polymeric materials were measured for nanoparticle retention after 9 and 39 washing cycles of a domestic laundering machine, in accordance with BS EN ISO 6330-2000. Nanoparticle concentration of 0.5 & 0.06 wt. % display lower retention of nanoparticles then polymeric material embedded with 0.25 & 0.15 wt. % nanoparticles. The increase in laundering cycles from 10 to 40 also highlights the positive effect that increasing hot-plate temperature has on nanoparticle retention (FIG. 26).

$TiO^2$ nanoparticles of Degussa Aerosil W741X deposited on PET material.
  0.5 wt. % concentration of nanoparticles deposited a surface concentration of 22 μg/cm².
  0.25 wt. % concentration of nanoparticles deposited a surface concentration of 16 μg/cm².
  0.15 wt. % concentration of nanoparticles deposited a surface concentration of 14 μg/cm².
  0.06 wt. % concentration of nanoparticles deposited a surface concentration of 9 μg/cm².

Example 5

Figure 27:
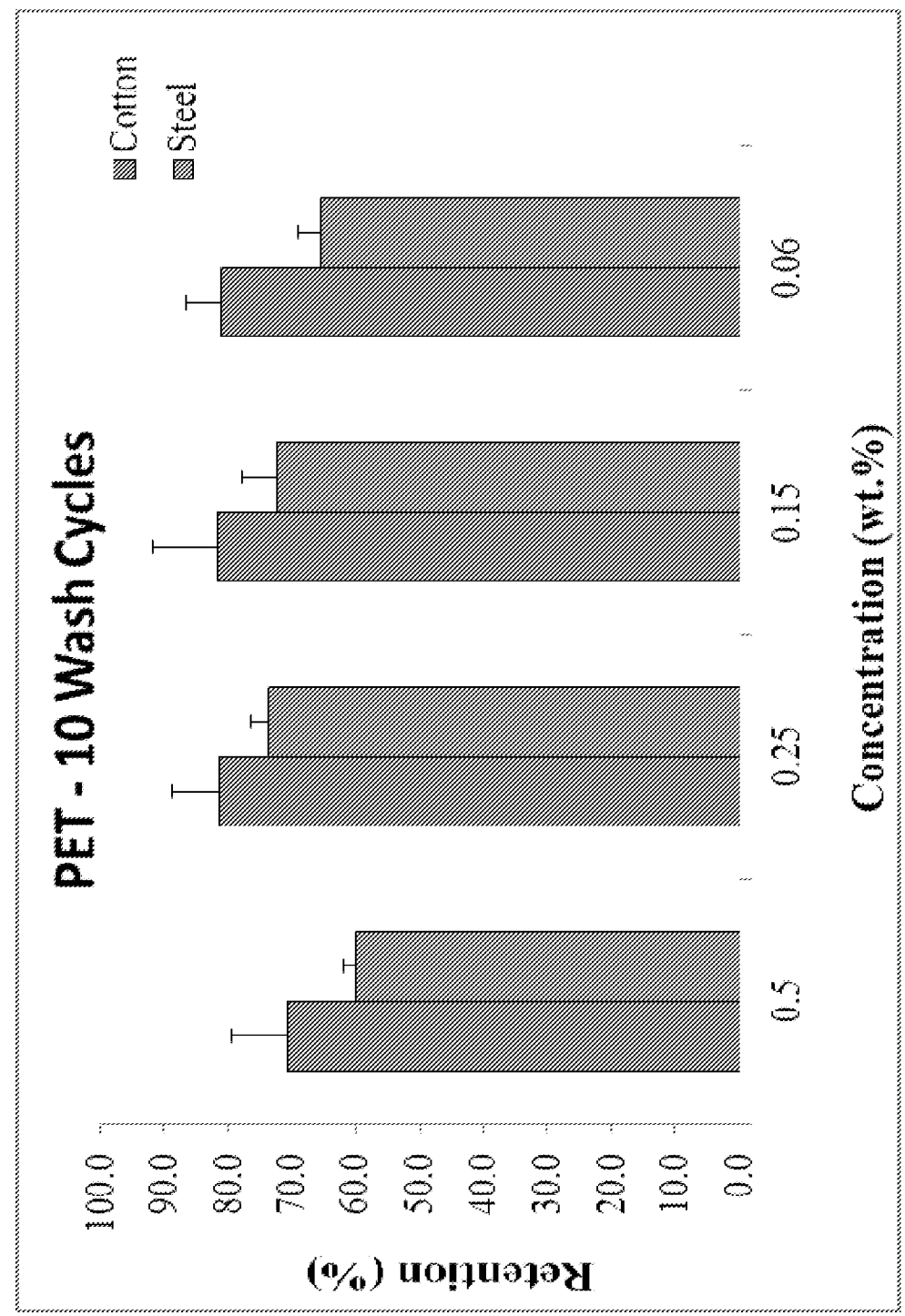
FIG. 27. Effect of roller materials on bonding of nanoparticles to PET

Effect of Roller Type for Pressure Application on Bonding of TiO2 Nanoparticles in PET This example 5 illustrates the effect of the stiffness of calendar roller during embedding of the nanoparticles to the polymeric material with varying concentrations (wt. %) of nanoparticles sprayed. PET is used as the polymeric material and the hot-plate temperature is set at 190° C. Nanoparticles were measured as percentage retention by characterization techniques. PET was measured for nanoparticle retention after 10 washing cycles (including a pre-wash cycle) of a domestic laundering machine, using BS EN ISO 6330-2000 as a methodology. It is displayed in the results that for all concentrations of nanoparticles, their retention to PET after 10 wash cycles using a cotton calendar roller over a steel roller for embedding is more efficient (FIG. 27).

$TiO^2$ nanoparticles of Degussa Aerosil W741X deposited on PET material.
  For Steel Roller
    0.5 wt. % concentration of nanoparticles deposited a surface concentration of 15 μg/cm².
    0.25 wt. % concentration of nanoparticles deposited a surface concentration of 11 μg/cm².
    0.15 wt. % concentration of nanoparticles deposited a surface concentration of 10 μg/cm².

0.06 wt. % concentration of nanoparticles deposited a surface concentration of 7 µg/cm².

For Cotton Roller 0.5 wt. % concentration of nanoparticles deposited a surface concentration of 20 µg/cm².

0.25 wt. % concentration of nanoparticles deposited a surface concentration of 16 µg/cm².

0.15 wt. % concentration of nanoparticles deposited a surface concentration of 14 µg/cm².

0.06 wt. % concentration of nanoparticles deposited a surface concentration of 9 µg/cm².

Example 6

Figure 28:
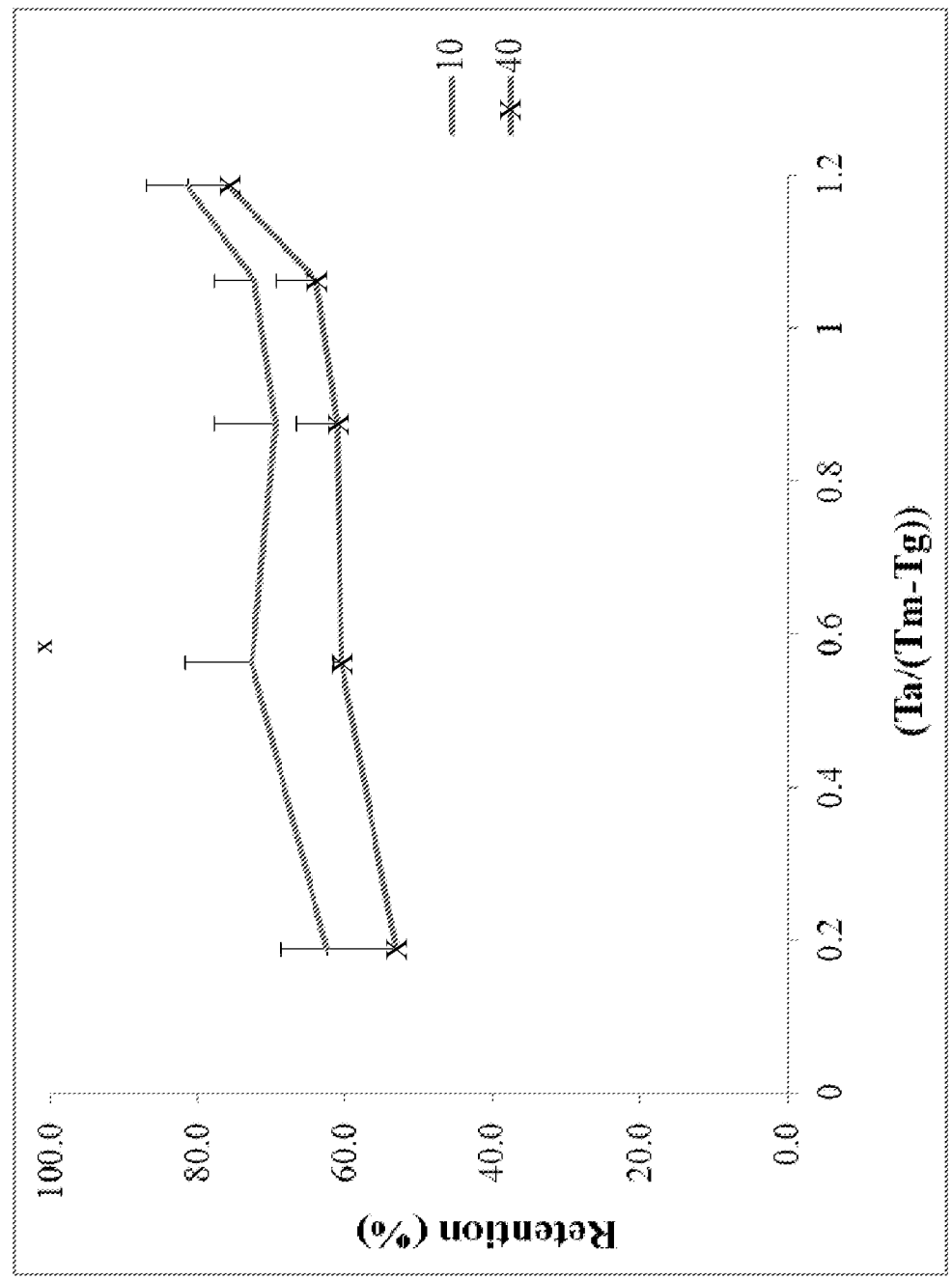
FIG. 28. effect of active temperature (Ta) as a function of the melting and glass transition temperature of the polymeric material FIG. 29. the effect of nanoparticle embedding temperature on two commercially available polymeric materials, Cellulose Acetate and Acrylic.

Effect of the Applied Temperature Normalized to the Temperature Window ($T_m$-$T_g$) on Bonding of $TiO_2$ Nanoparticles in PET This example 6 illustrates the effect of active temperature ($T_a$) as a function of the melting and glass transition temperature of the polymeric material. PET is used as the polymeric material and the concentration of nanoparticles sprayed on is 0.25 wt. %. Nanoparticles were measured as percentage retention by characterization techniques. PET was measured for nanoparticle retention after 10 and 40 washing cycles (including a pre-wash cycle) of a domestic laundering machine, in accordance with BS EN ISO 6330-2000. It is displayed in the results that the active temperature of embedding has an effect on the retention of nanoparticles to the PET after 10 and 40 laundering cycles (FIG. 28).

Example 7

Effect on Different Thermoplastic Polymers

Figure 29:
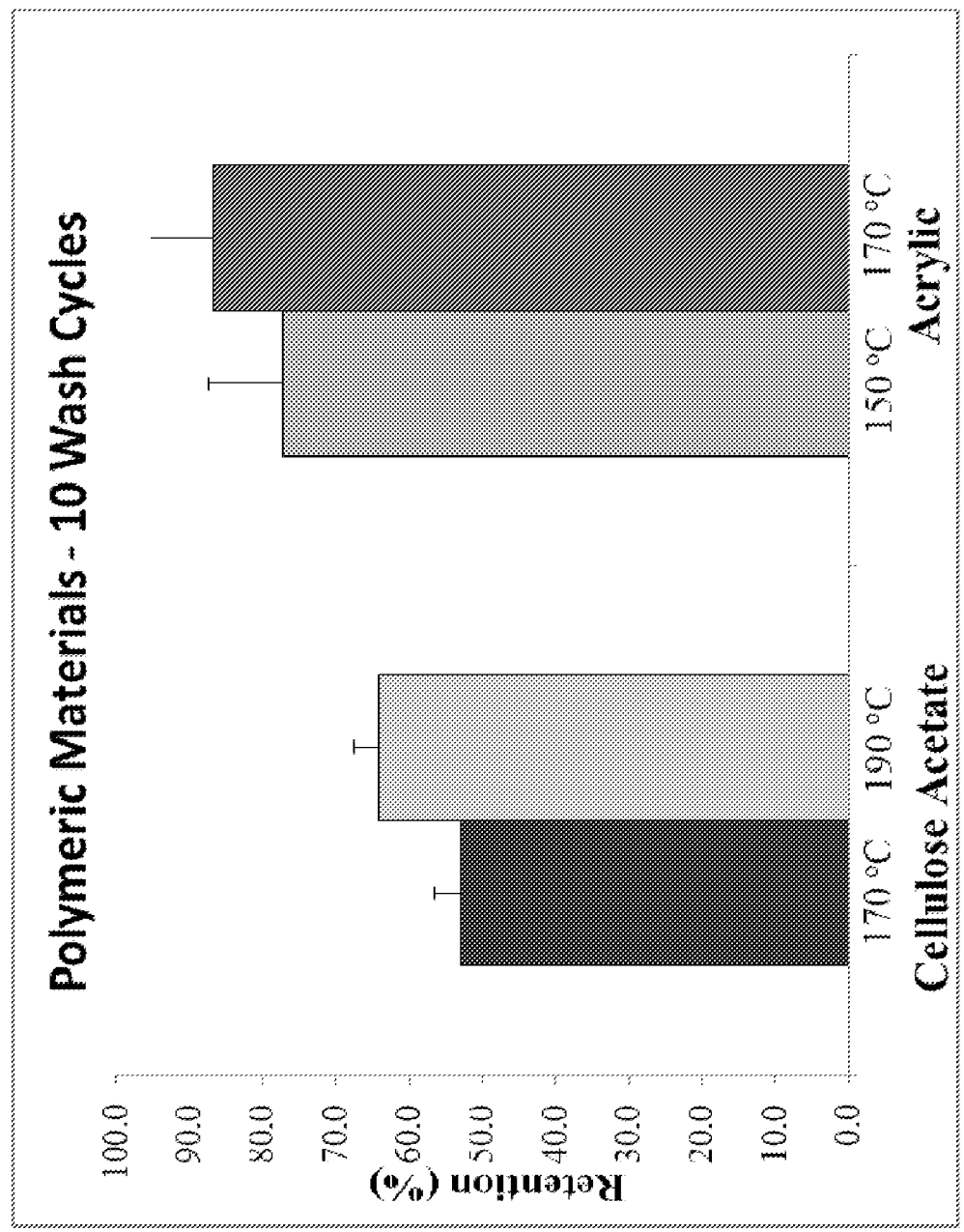

This example illustrates the effect of nanoparticle embedding temperature on two commercially available polymeric materials, Cellulose Acetate and Acrylic. The concentration of nanoparticles sprayed is 0.25 wt. %. Nanoparticles were measured as percentage retention by characterization techniques. PET was measured for nanoparticle retention after 10 washing cycles (including a pre-wash cycle) of a domestic laundering machine, using BS EN ISO 6330-2000 as a methodology. It is displayed in the results that the active temperature of embedding has an effect on the retention of nanoparticles to both Cellulose acetate and Acrylic material after 10 laundering cycles (FIG. 29).

Example 8

Microbial Data on TiO2 and Ag—TiO2 Loaded Textiles (by NanoPreg) as a Function of Wash Cycles (0, 1 (Pre-Wash), 10, 40)

Antimicrobial tests were performed using the clinical strain of methicillin resistant (MRSA) *Staphylococcus aureus* K 324, *Escherichia coli* PA 170, fabric samples impregnated with $TiO_2$ at concentrations of 0.15% and 0.5%, after 0, 1, 10 and 40 wash cycles and Ag.TiO₂ loaded fabrics (concentration as above), after 0, 1 and 10 wash cycles.

The samples inoculated with bacteria were subject to UVA irradiation with a Wood's lamp at λ=365 nm, GP=1.5 mW/cm², the irradiation time of 40 and 60 min for $TiO_2$ samples, 20 and 40 min for Ag.TiO₂ samples. The analogous systems were kept in the dark. Additional, benchmark antimicrobial test for the $TiO_2$-free PET fabric illuminated in conditions as above, has been performed. After exposure the cultures were diluted with PBS and spread onto TSA plates. The colony forming units were counted after incubation for 24-48 h at 37° C. The percentage reduction of bacteria (R) was calculated as follows:

$$R=100(C-A)/C$$

Where A refers to the number of microorganisms recovered from the inoculated, treated fabric samples, incubated for 20, 40, 60 min under UVA or kept in the dark. C is the number of the cells recovered from the inoculated treated and untreated fabric samples, immediately after inoculation (at '0' time) according to AATCC test method 100-2004, in modification.* (*Colorists, A.A.T.C.a., *Antibacterial Finishes on Textile Materials: Assessment of*, in *AATCC Technical Manual*. 2004: Research Triangle Park, N.C.).

Figure 30A:
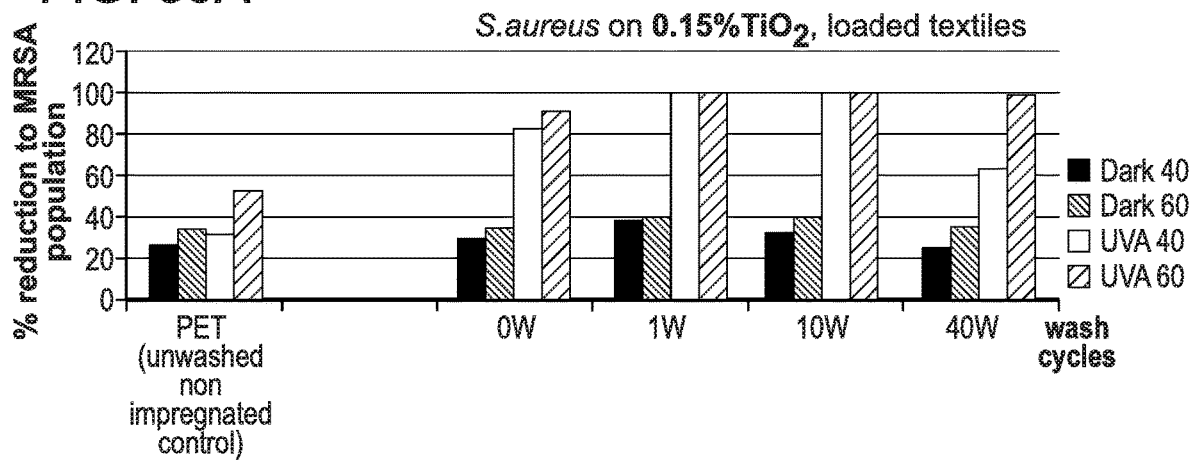
FIG. 30A-C. Reduction of methicillin resistant (MRSA) *Staphylococcus aureus* on PET fabric impregnated with (A) 0.15 wt. %, (B) 0.25 wt. %, and (C) 0.50 wt. % of nano-$TiO_2$. [PET—reference not containing titania, Dark 40' Dark 60'—samples kept in the dark for 40 and 60 min., UVA 40' and UVA 60'—$TiO_2$-PET samples UVA-irradiated for 40 and 60 min.]
Figure 30B:
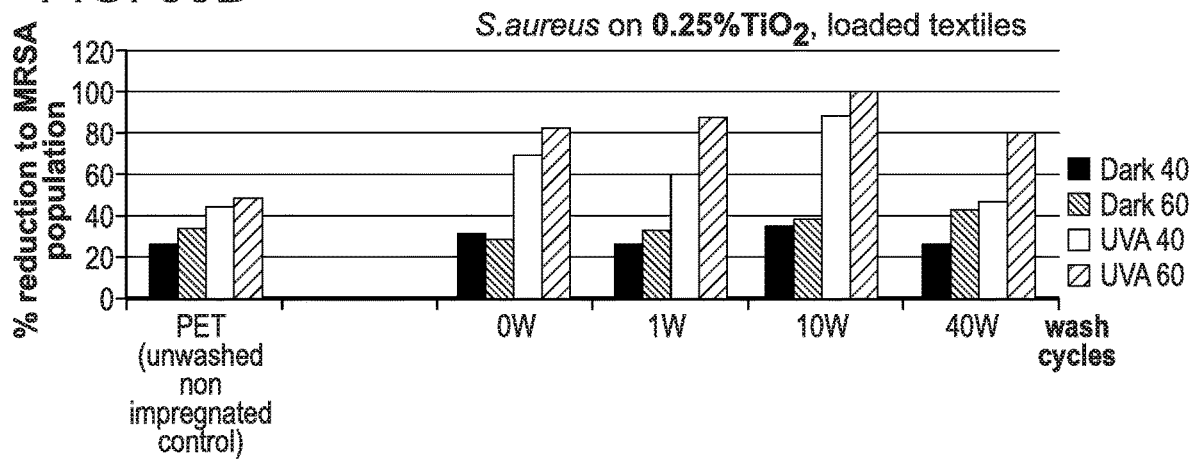
Figure 30C:
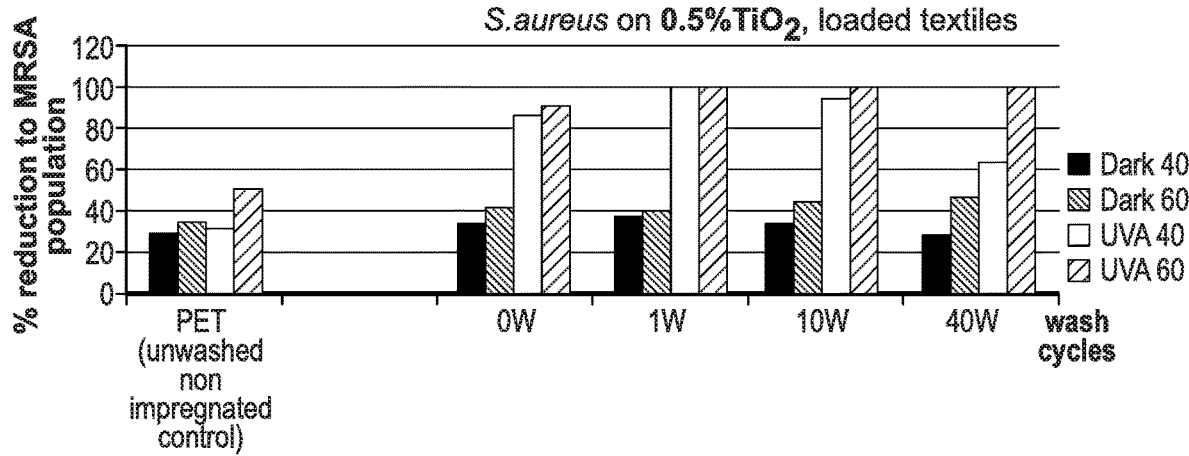
Figure 31A:
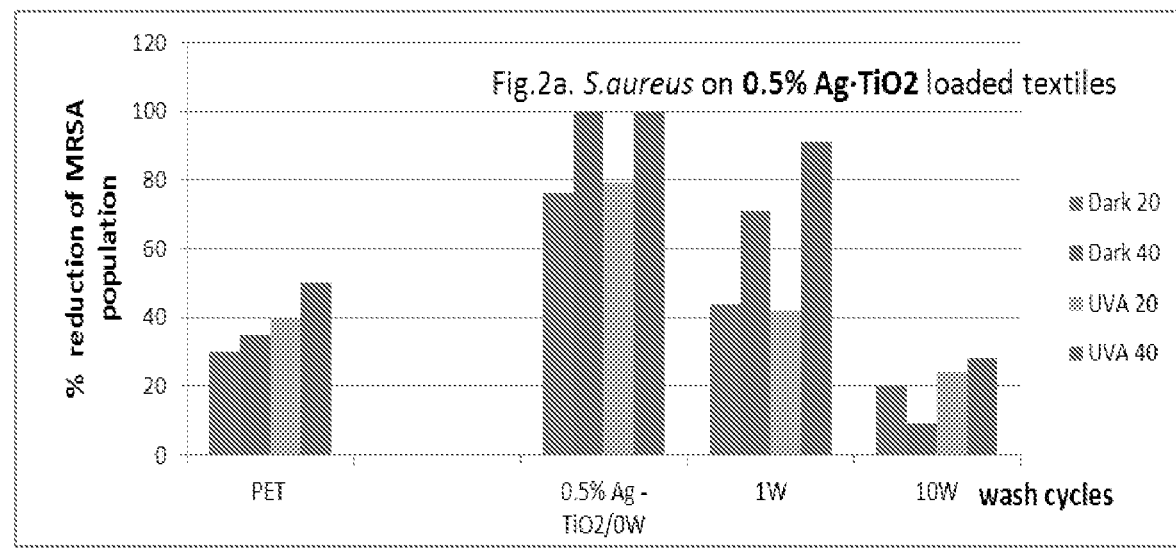
FIG. 31A-B. Reduction of methicillin resistant (MRSA) *Staphylococcus aureus* on PET fabric impregnated with (A) 0.15 wt. %, and (B) 0.50 wt. % of nano-$AgTiO_2$.
Figure 31B:
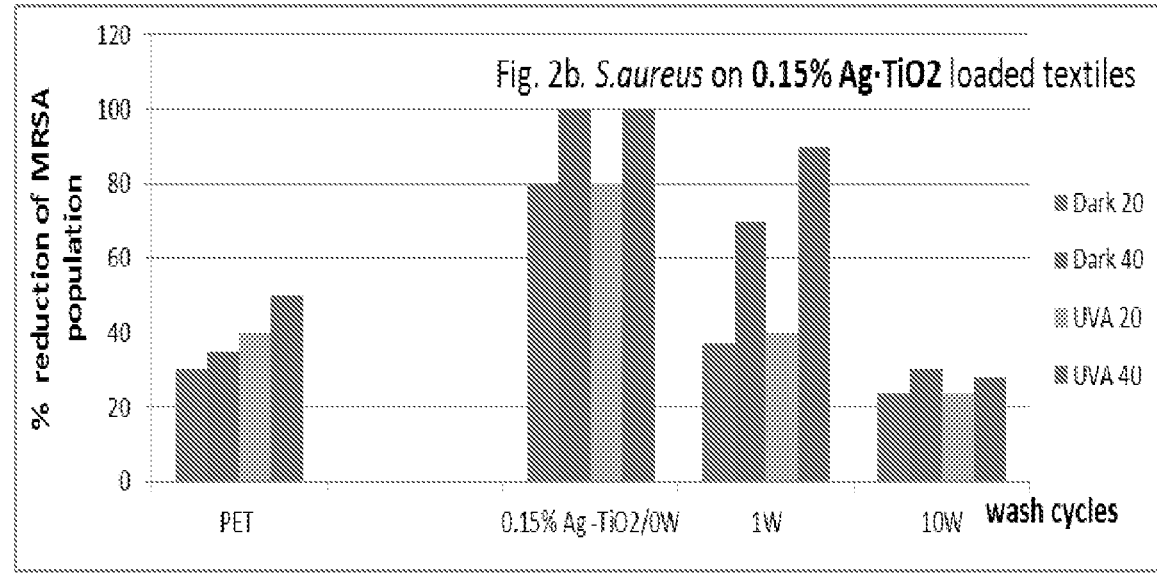
Figure 32A:
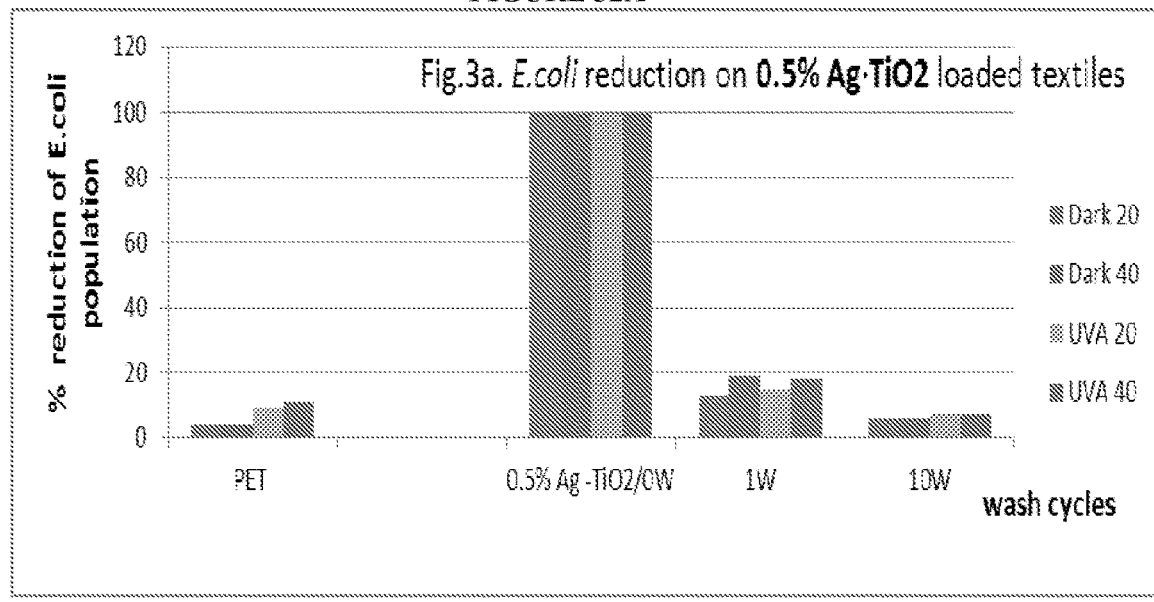
FIG. 32A-B. Reduction of *Escherichia coli* ESBL (+) on PET fabric impregnated with (A) 0.15 wt. %, and (B) 0.50 wt. % of nano-$AgTiO_2$. Dark 20' Dark 40'—samples kept in the dark for 20 and 40 min., UVA 20' and UVA 40'—$TiO_2$-PET samples UVA-irradiated for 20 and 40 min.
Figure 32B:
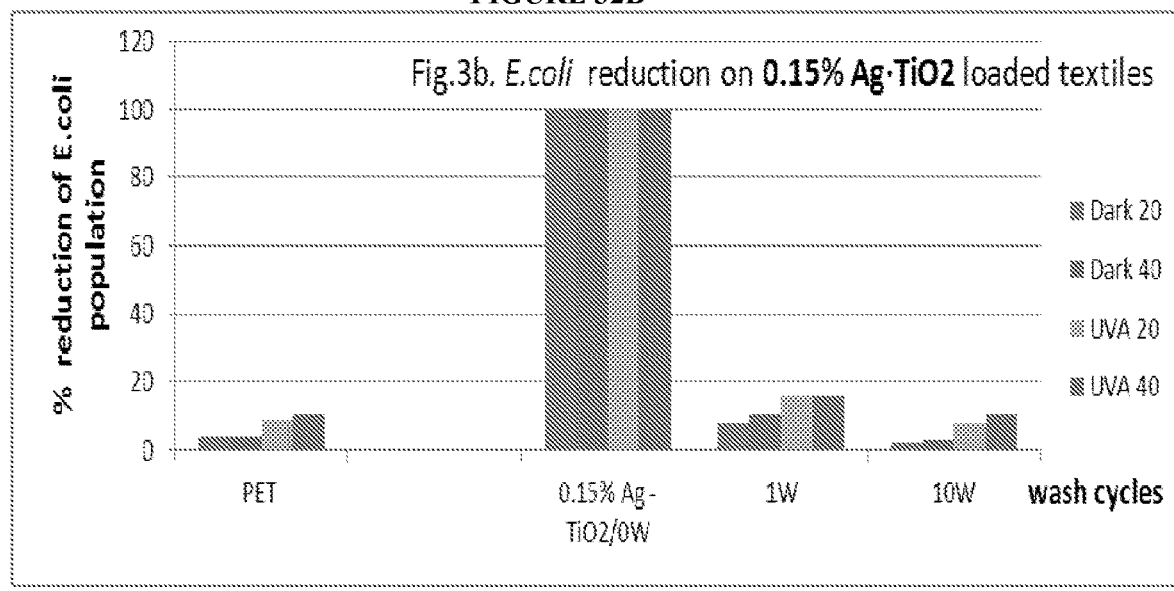

Reduction of MRSA population in contact with the 0.15%, 0.25% and 0.5% $TiO_2$ loaded textiles is maintained at above 50%, after exposure to UVA for 40 and 60 min. This effect is observed for both—unwashed samples and samples after 1, 10 and 40 wash cycles (FIG. 30a-c). Very good bactericidal activity (100% reduction) of unwashed fabrics, impregnated with 0.15% and 0.5% Ag—$TiO_2$, is observed against MRSA population. After 1 and 10 wash cycles, this effect gradually decreases (FIG. 31a-b). The population of *E. coli* is reduced completely (100%) only after contact with Ag—$TiO_2$ unwashed fabrics, in both concentrations (FIG. 32a-b).

Certain embodiments according to the invention have been disclosed. These embodiments are illustrative of, and not limiting on, the invention. Other embodiments, as well as various modifications and combinations of the disclosed embodiments, are possible and within the scope of this disclosure.

What is claimed is:

1. A polymeric material comprising:
   a first side and a second side;
   a modified surface layer on the first side comprising a plurality of separated patches of microbiocidal nanoparticles embedded therein in a non-continuous distribution in which each patch is not in contact with other patches, the modified surface layer having a thickness less than or equal to a diameter of said nanoparticles; and
   a bulk polymer extending between said modified surface layer and the second side, wherein the second side and the bulk polymer are free of the nanoparticles,
   wherein the polymeric material has a thickness that is greater than the diameter of the nanoparticles,
   wherein a penetration depth of at least some of the nanoparticles within the modified surface layer is about half of a shortest diameter of the nanoparticles,
   wherein the polymeric material is a thermoplastic textile material, wherein the surface concentration of the nanoparticles is between 1-200 µg/cm², and wherein the patches have an average separation of about 0.5-2 microns.

2. The polymeric material of claim 1, wherein the surface concentration of the nanoparticles is between 10-30 µg/cm².

3. A polymeric material produced by a process comprising the steps of:
   providing a polymeric material having at a first side and a second side;
   heating a surface layer of the first side to soften the surface layer at a depth sufficient to receive and embed nanoparticles in the surface layer; and depositing microbiocidal nanoparticles comprising a microbiocidal agent onto the softened surface layer to immobilize the microbiocidal nanoparticles in the softened surface layer, to thereby form a modified surface layer having a plurality of separated patches of the microbiocidal nanoparticles embedded in the first surface in a non-continuous distribution in which each patch is not in contact with other patches;

wherein the patches have on average a separation of about 0.5 to 2 microns, wherein the modified surface layer has a thickness less than or equal to a diameter of said microbiocidal nanoparticles;

wherein the material further comprises a bulk of the polymeric material extending between said modified surface layer and the second side, wherein the bulk of, and the second side of, the polymeric material are free of the microbiocidal nanoparticles; and wherein the polymeric material has a thickness that is greater than the diameter of the microbiocidal nanoparticles;

wherein a penetration depth of at least some of the microbiocidal nanoparticles within the modified surface layer is about half of a shortest diameter of the microbiocidal nanoparticles; and wherein the polymeric material is a thermoplastic textile material.

4. The polymeric material of claim 3, wherein the surface layer is softened to a depth less than or equal to the diameter of the microbiocidal nanoparticles.

5. The polymeric material of claim 4, wherein said microbiocidal agent comprises a metal-based formulation.

6. The polymeric material of claim 5, wherein said metal-based formulation comprises $TiO_2$, $Ag_2O$, $Ag$—$TiO_2$, or a combination thereof.

7. The polymeric material of claim 6, wherein said polymeric material comprises a thermoplastic polymer.

8. The polymeric material of claim 7, wherein said thermoplastic polymer comprises polyethylene terephthalate.

* * * * *